(12) United States Patent
Lin

(10) Patent No.: US 9,261,680 B2
(45) Date of Patent: Feb. 16, 2016

(54) FIVE-PIECE WIDE-ANGLE LENS MODULE

(71) Applicant: Kinko-Optical Co., Ltd, Taichung (TW)

(72) Inventor: Yi-Zhi Lin, Taichung (TW)

(73) Assignee: KINKO-OPTICAL CO., LTD., Taichung (TW)

( * ) Notice: Subject to any disclaimer, the term of this patent is extended or adjusted under 35 U.S.C. 154(b) by 0 days.

(21) Appl. No.: 14/508,857

(22) Filed: Oct. 7, 2014

(65) Prior Publication Data

US 2015/0077862 A1  Mar. 19, 2015

Related U.S. Application Data

(63) Continuation-in-part of application No. 14/134,034, filed on Dec. 19, 2013.

(30) Foreign Application Priority Data

Sep. 16, 2013 (TW) .............................. 102133558 A

(51) Int. Cl.
G02B 3/02 (2006.01)
G02B 13/18 (2006.01)
G02B 13/04 (2006.01)
G02B 9/60 (2006.01)

(52) U.S. Cl.
CPC ................ *G02B 13/18* (2013.01); *G02B 13/04* (2013.01); *G02B 9/60* (2013.01)

(58) Field of Classification Search
CPC ....... G02B 13/0045; G02B 13/18; G02B 9/60
USPC ................................... 359/642–830
See application file for complete search history.

(56) References Cited

U.S. PATENT DOCUMENTS

2015/0077861 A1* 3/2015 Lin .................... G02B 13/06
359/714

* cited by examiner

*Primary Examiner* — Mahidere Sahle

(74) *Attorney, Agent, or Firm* — Muncy, Geissler, Olds & Lowe PC

(57) ABSTRACT

A five-piece wide-angle lens module includes a first lens, a second lens, a third lens, a stop, a fourth lens and a fifth lens, which are sequentially arranged from an object side to an image side. The first lens has a negative refractive power, a convex surface on the object side, and a concave surface on the image side. The second lens has a negative refractive power and two concave surfaces on both sides. The third lens has a positive refractive power. The fourth lens has a positive refractive power and two convex surfaces on both sides. The fifth lens has a negative refractive power. Thereby, the five-piece wide-angle lens module can provide good image quality even in the environment with severe temperature changes.

19 Claims, 30 Drawing Sheets

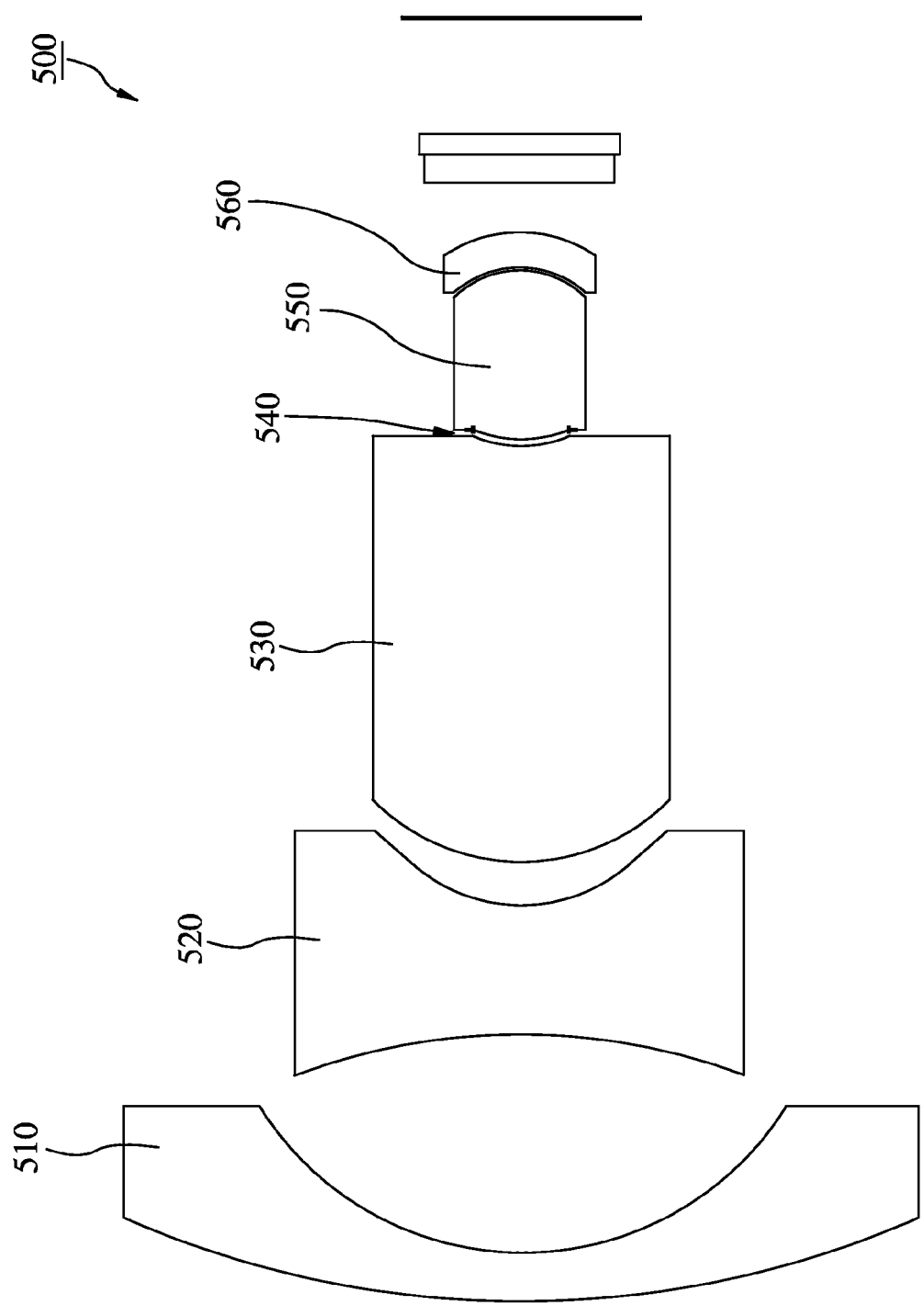

FIVE-PIECE WIDE-ANGLE LENS MODULE

CROSS-REFERENCE TO RELATED APPLICATION

This patent application is a continuation-in-part of U.S. patent application Ser. No. 14/134,034 filed Dec. 19, 2013 entitled "five-piece wide-angle lens module", the entire disclosure of which is incorporated herein by reference.

BACKGROUND OF THE INVENTION

1. Field of the Invention

The present invention relates generally to an optical system, and more particularly to a five-piece wide-angle lens module.

2. Description of the Related Art

When a driver backs a car, he or she usually relies on the rear-view mirror and the side-view mirrors to see the road behind the car. However, the driver is still unable to see somewhere behind the car, which is called the "blind zone". Therefore, rear-view video cameras are installed on vehicles to assist the driver to have better rear visibility and wider field of view.

In some areas having obvious season changes, the temperature can go down to −20° C. or lower in winter and up to 60° C. or higher in summer. Therefore, the rear-view video cameras must have excellent and consistent imaging quality in high/low temperature environment, otherwise the rear-view video cameras can be unsatisfying.

SUMMARY OF THE INVENTION

It is a main objective of the present invention to provide an optical system which can provide excellent imaging quality in both high and low temperature environments.

It is another main objective of the present invention to provide a wide-angle optical system.

To achieve the above and other objectives of the present invention, a five-piece wide-angle lens module is provided, in which the lens module includes in a sequence from an object side to an image side of a first lens, a second lens, a third lens, a stop, a fourth lens, and a fifth lens. The first lens has a negative refractive power, a convex surface on the object side, and a concave surface on the image side. The second lens has a negative refractive power and two concave surfaces on both the object side and the image side respectively. The third lens has a positive refractive power. The fourth lens has a positive refractive power and two convex surfaces on both the object side and the image side respectively. The fifth lens has a negative refractive power. Each of the second lens, the third lens, the fourth lens and the fifth lens has at least one aspheric surface. The five-piece wide-angle lens module satisfies the following relationship: $2<(r_8-r_9)/(r_8+r_9)<4.2$, in which $r_8$ is a radius of curvature of the object side of the fourth lens, $r_9$ is a radius of curvature of the image side of the fourth lens.

To achieve the above and other objectives of the present invention, a five-piece wide-angle lens module is provided, in which the lens module includes in a sequence from an object side to an image side of a first lens, a second lens, a third lens, a stop, a fourth lens, and a fifth lens. The first lens has a negative refractive power, a convex surface on the object side, and a concave surface on the image side. The second lens has a negative refractive power and two concave surfaces on both the object side and the image side respectively. The third lens has a positive refractive power and a concave surface on the image side. The fourth lens has a positive refractive power and two convex surfaces on both the object side and the image side respectively. The fifth lens has a negative refractive power. Each of the second lens, the third lens, the fourth lens and the fifth lens has at least one aspheric surface. The five-piece wide-angle lens module satisfies the following relationship: $-12<(r_2-r_3)/(r_2+r_3)<-2$; in which $r_2$ is a radius of curvature of the image side of the first lens, $r_3$ is a radius of curvature of the object side of the second lens.

To achieve the above and other objectives of the present invention, a five-piece wide-angle lens module is provided, in which the lens module includes in a sequence from an object side to an image side of a first lens, a second lens, a third lens, a stop, a fourth lens, and a fifth lens. The first lens has a negative refractive power, a convex surface on the object side, and a concave surface on the image side. The second lens has a negative refractive power and two concave surfaces on both the object side and the image side respectively. The third lens has a positive refractive power. The fourth lens has a positive refractive power and two convex surfaces on both the object side and the image side respectively. The fifth lens has a negative refractive power. Each of the second lens, the third lens, the fourth lens and the fifth lens has at least one aspheric surface. The five-piece wide-angle lens module satisfies the following relationship: $0.6<d_4/f<1$; in which $d_4$ is a distance from the image side of the second lens to the object side of the third lens along an optical axis of the five-piece wide-angle lens module, f is a focal length of the five-piece wide-angle lens module.

To achieve the above and other objectives of the present invention, a five-piece wide-angle lens module is provided, in which the lens module includes in a sequence from an object side to an image side of a first lens, a second lens, a third lens, a stop, a fourth lens, and a fifth lens. The first lens has a negative refractive power, a convex surface on the object side, and a concave surface on the image side. The second lens has a negative refractive power and two concave surfaces on both the object side and the image side respectively. The third lens has a positive refractive power. The fourth lens has a positive refractive power and two convex surfaces on both the object side and the image side respectively. The fifth lens has a negative refractive power. Each of the second lens, the third lens, the fourth lens and the fifth lens has at least one aspheric surface. The five-piece wide-angle lens module satisfies the following relationship: $0<d_9/f<0.2$; in which $d_9$ is a distance from the image side of the fourth lens to the object side of the fifth lens along an optical axis of the five-piece wide-angle lens module, f is a focal length of the five-piece wide-angle lens module.

Subject to the aforementioned design, the five-piece wide-angle lens module can have excellent image quality in severe environments (e.g. temperature ranging from −50° C. to 100° C.).

The following detailed description will further explain the full scope of applications for the present invention. However, it should be understood that the detailed description and specific examples, while indicating preferred embodiments of the invention, are given by way of illustration only, since various changes and modifications within the spirit and scope of the invention will become apparent to those with the proper technical knowledge from this detailed description.

BRIEF DESCRIPTION OF THE DRAWINGS

The present invention can be understood more fully by referring to the detailed description below, as well as the accompanying drawings. However, it must be understood that both the descriptions and drawings are given by way of illustration only, and thus do not limit the present invention.

FIG. 1 is a schematic view of a lens module in accordance with the first embodiment of the present invention;

FIG. 5 is a schematic view of a lens module in accordance with the fifth embodiment of the present invention;

DETAILED DESCRIPTION OF THE INVENTION

Figure 1:
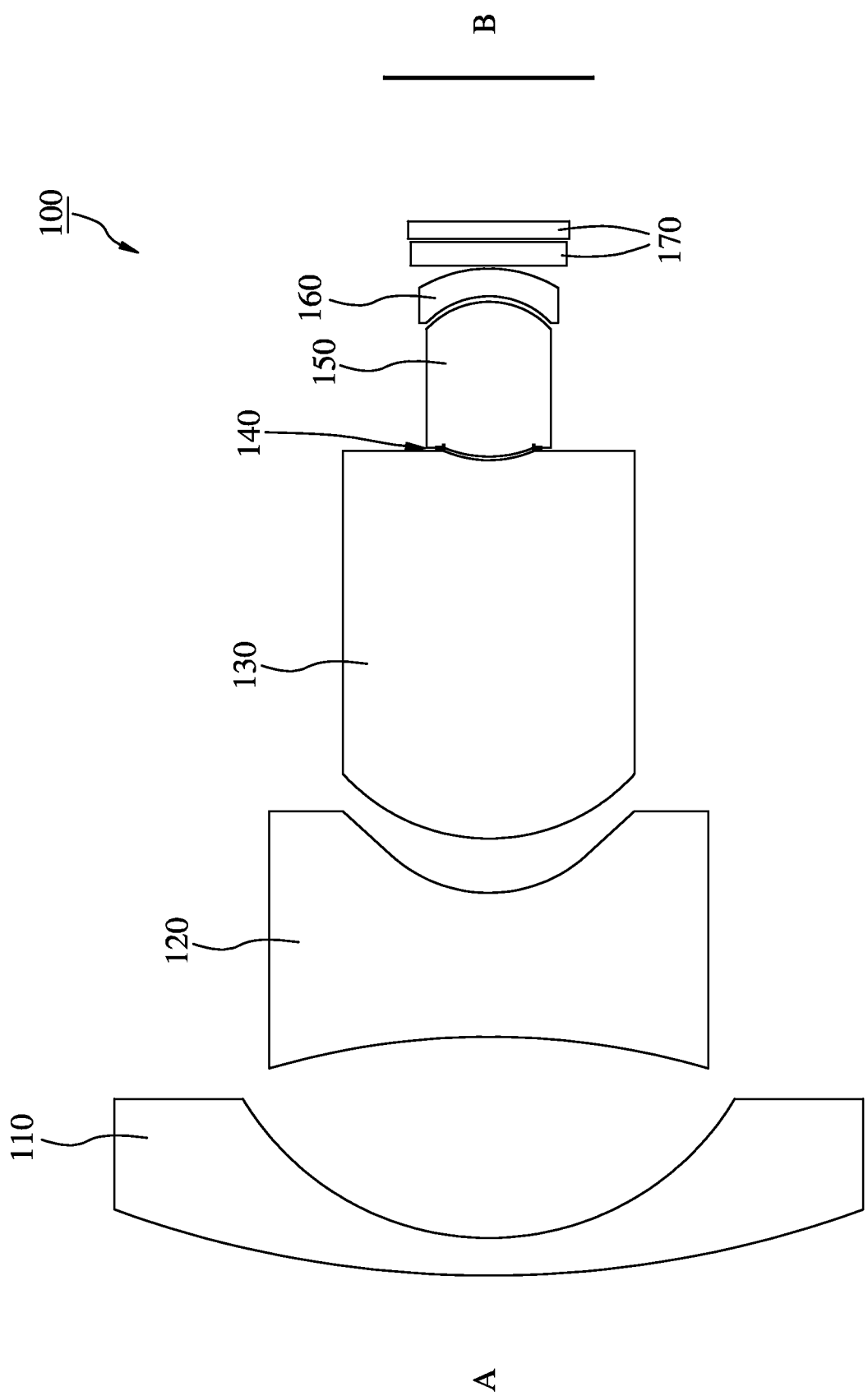
FIG. 1A is a diagram showing the field curvature and the distortion of the lens module in accordance with the first embodiment of the present invention.
FIG. 1B is a diagram showing the transverse ray fan plot of the lens module in accordance with the first embodiment of the present invention at 25° C.
FIG. 1C is a diagram showing the transverse ray fan plot of the lens module in accordance with the first embodiment of the present invention at −50° C.
FIG. 1D is a diagram showing the transverse ray fan plot of the lens module in accordance with the first embodiment of the present invention at 100° C.
FIG. 1E is a diagram showing the lateral color aberration of the lens module in accordance with the first embodiment of the present invention.
Figure 1A:
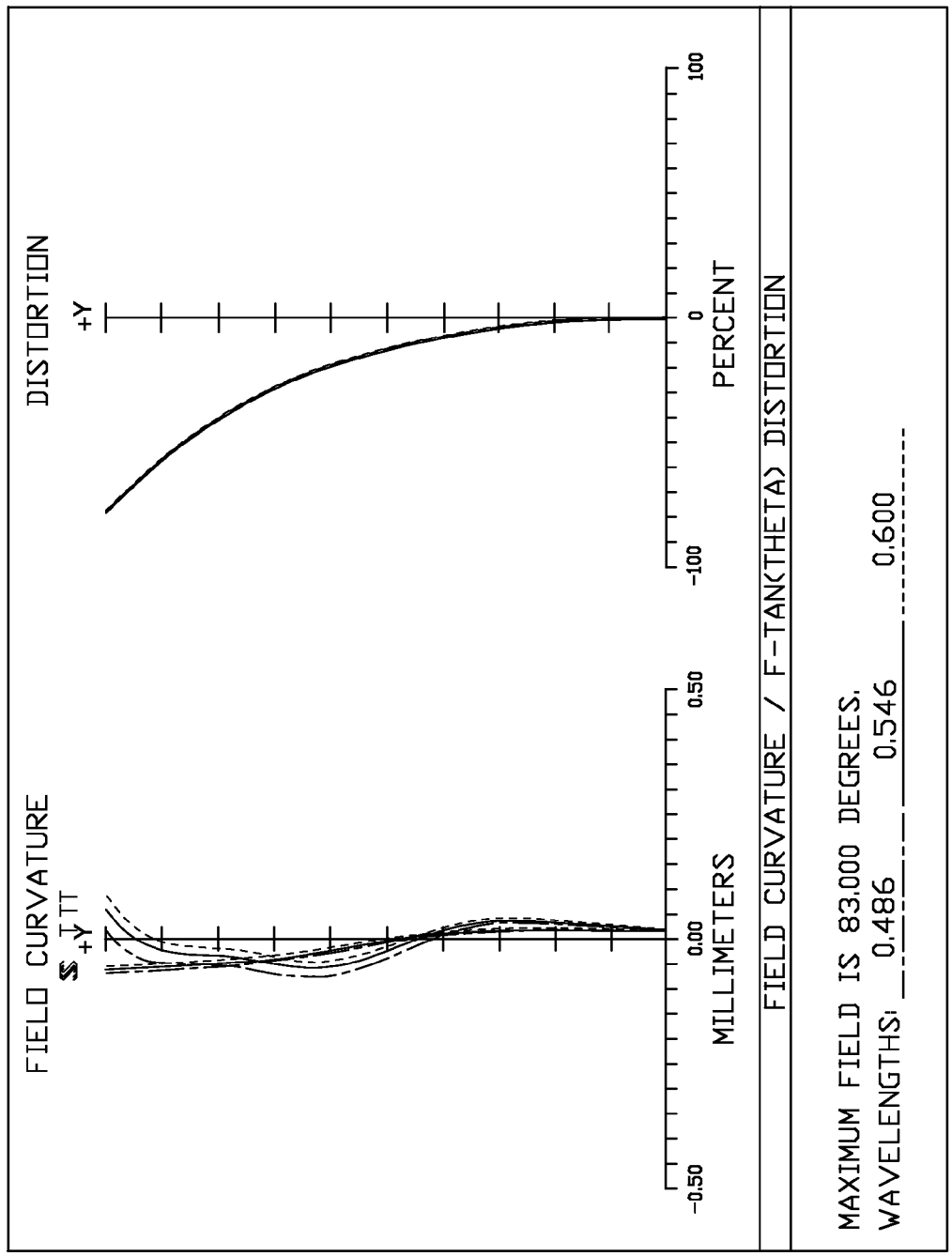
Figure 1B:
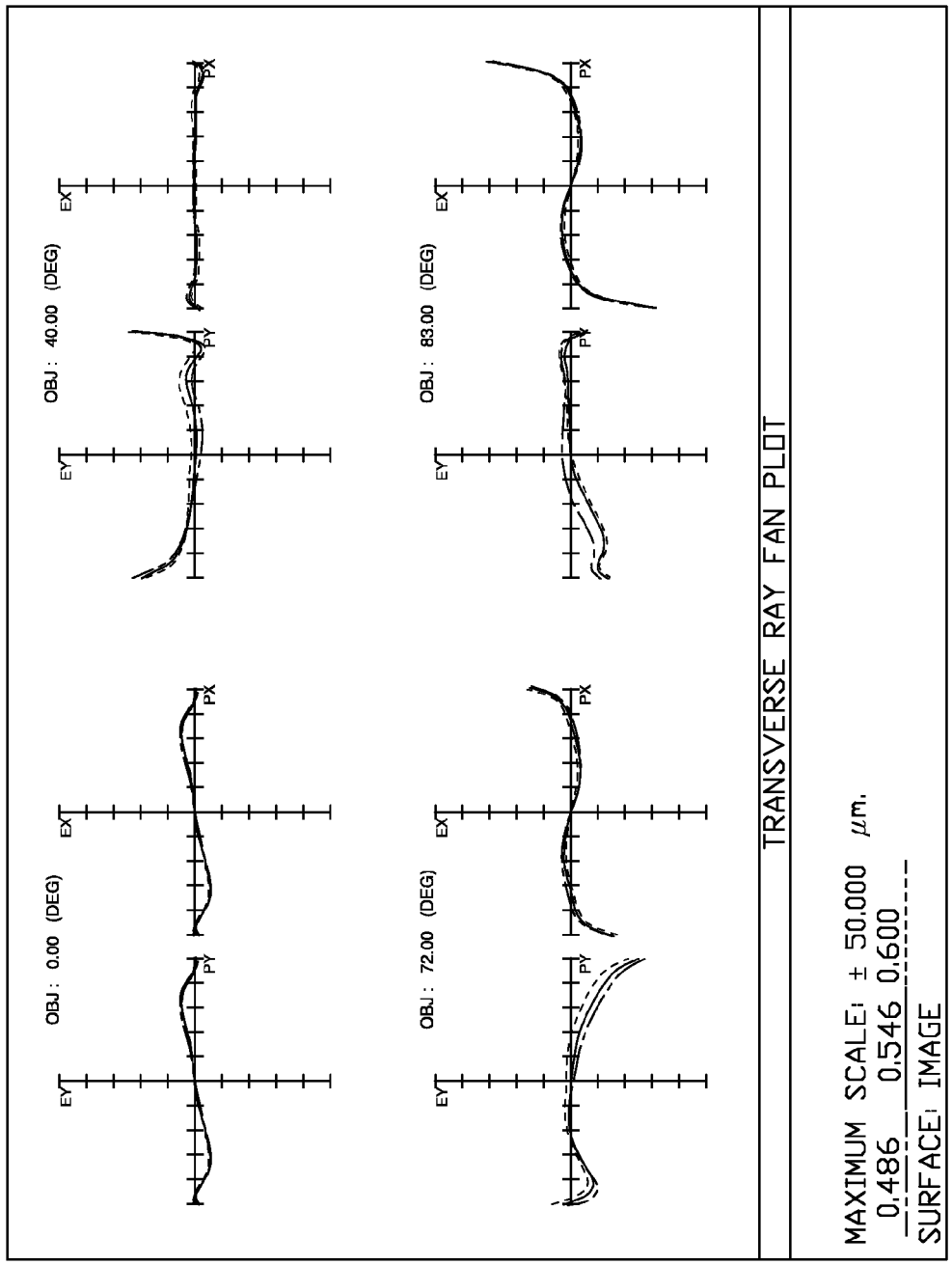
Figure 1C:
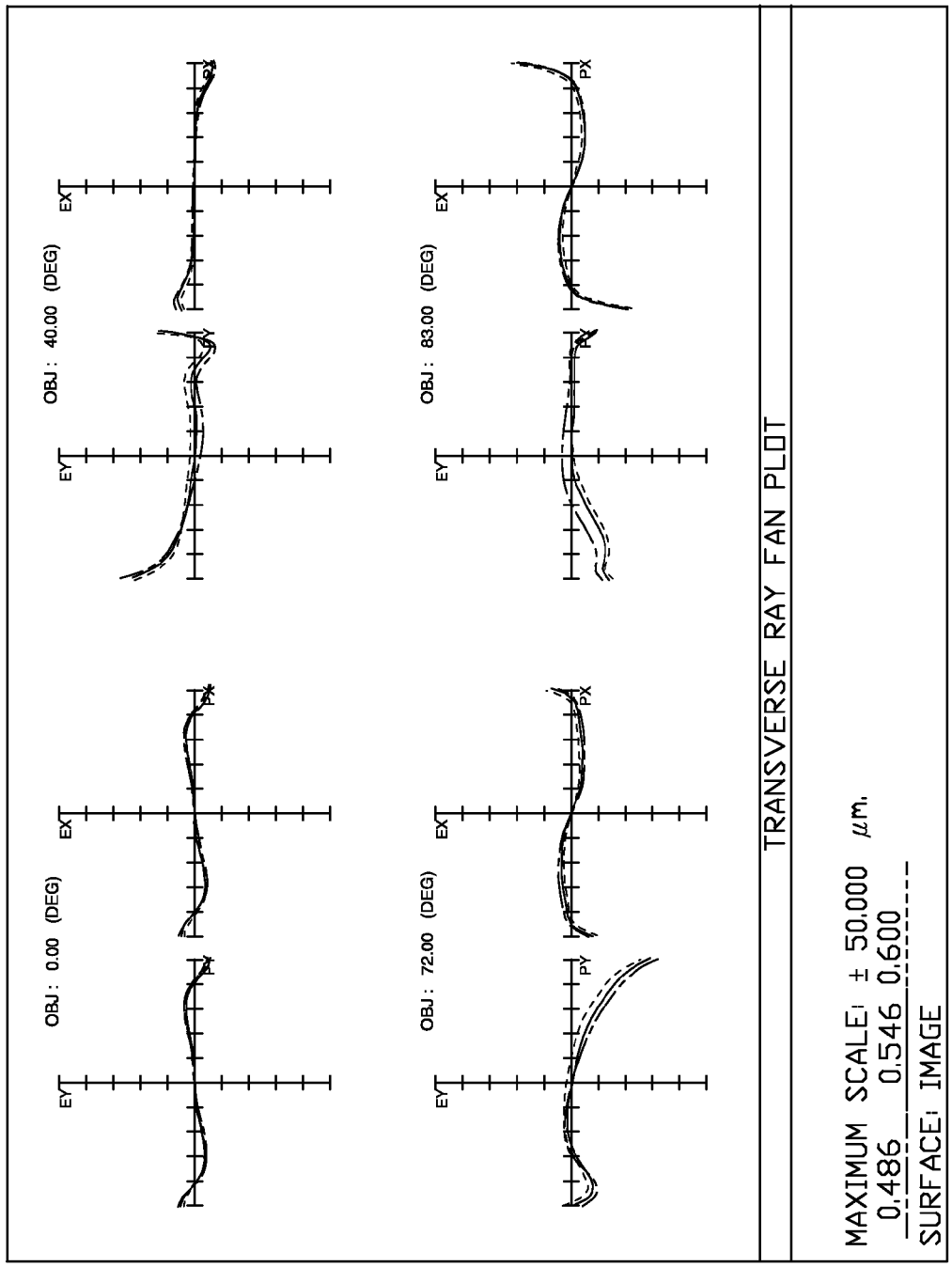
Figure 1D:
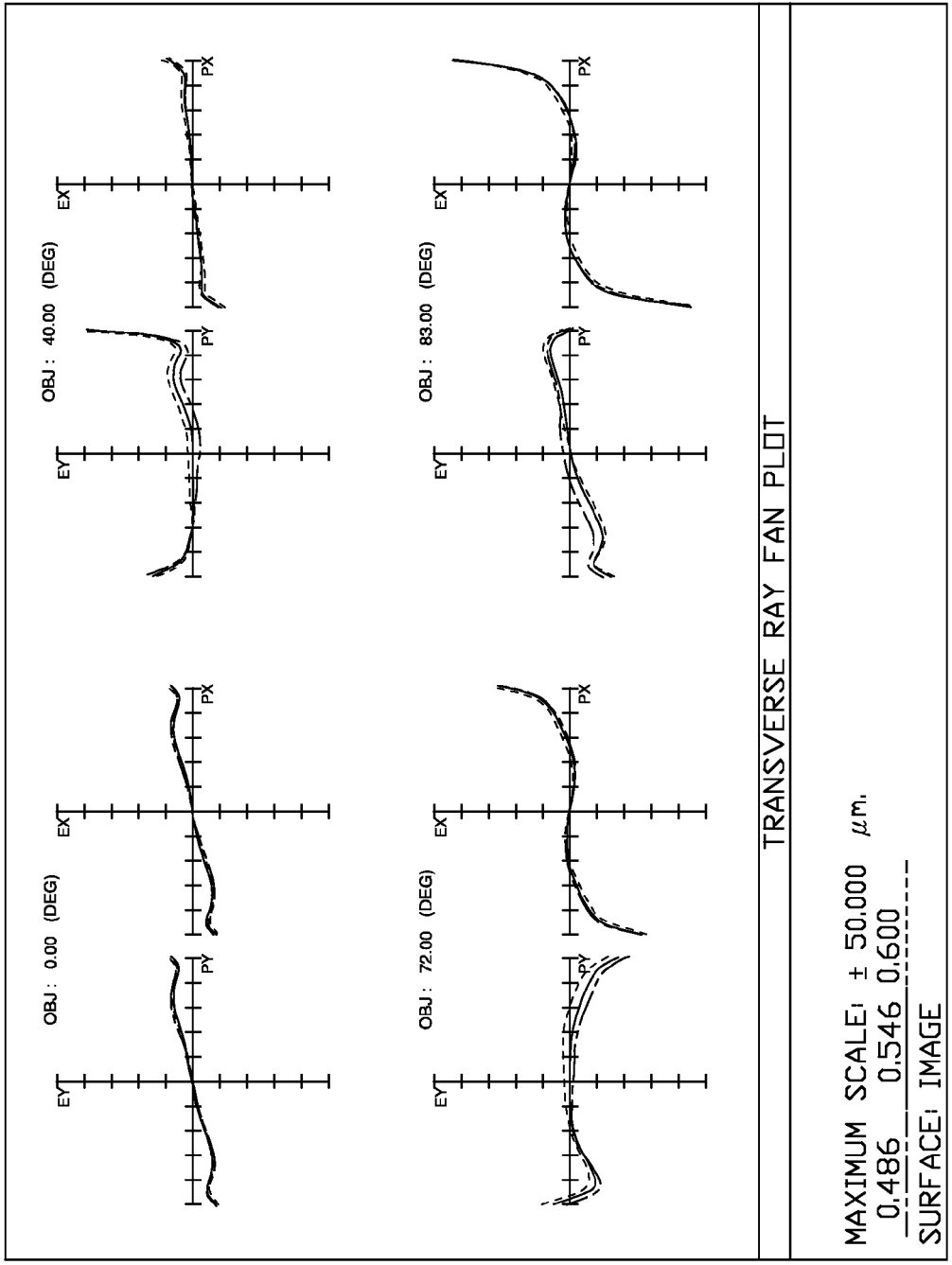

Please refer to FIG. 1 for a five-piece wide-angle lens module in accordance with the first embodiment of the present invention. The lens module 100 includes in a sequence from an object side A to an image side B of: a first lens 110, a second lens 120, a third lens 130, a stop 140, a fourth lens 150, and a fifth lens 160. CCD, CMOS or other image sensor can be disposed at the image side B. One or more plate glasses 170 such as an optical filter and/or a protection glass can be additionally disposed between the image sensor and the fifth lens 160, in which the amount of the plate glass 170 can be adjusted subject to the requirements.

The first lens 110 is a meniscus lens with a negative refractive power and has a convex surface on the object side and a concave surface on the image side so as to provide the wide angle characteristic.

The second lens 120 also has a negative refractive power and shares the refractive power loading with the first lens 110, such that the system aberration can be controlled. Both the object side and the image side of the second lens 120 are concave surfaces, which can lead to modification of aberration caused by marginal rays.

The third lens 130 has a positive refractive power to balance out the negative refractive power of the first and second lenses 110 and 120 in order to further modify the aberration. The object side of the third lens 130 is a convex surface, and the image side thereof is a concave surface. Since the third lens 130 has the concave surface on the image side, the incident angle of lights incident on the stop 140 can be lowered. As such, the lights can be refracted smoother, which is helpful for the reduction of the system sensitivity.

The stop 140 is designed to locate between the third lens 130 and the fourth lens 150. Such arrangement is helpful to balance out the system refractive power and efficiently reduce the system sensitivity.

The fourth lens 150 has a positive refractive power and two convex surfaces on both the object side and the image side. Since the fourth lens 150 has the convex surface on the object side, the incident angle of lights incident on the fourth lens 150 from the stop 140 can be lowered. As such, the lights can be refracted smoother, which is helpful for the reduction of the system sensitivity.

The fifth lens 160 has a negative refractive power, a concave surface on the object side and a convex surface on the image side.

The optical feature data of the five-piece wide-angle lens module 100 in accordance with the first embodiment are listed in Table 1:

TABLE 1

| Lens | Surface | Radius | Thickness | Nd | Vd | Conic |
|---|---|---|---|---|---|---|
| Object | | ∞ | ∞ | | | 0 |
| First lens | Object surface 1 | 23 | 0.8 | 1.834 | 42.7 | 0 |
| | Image surface 2 | 6 | 4.3 | | | 0 |
| Second lens | Object surface 3 | −8.1 | 3.09 | 1.53 | 56.1 | −32.5 |
| | Image surface 4 | 4.78 | 1.15 | | | 0.9008 |
| Third lens | Object surface 5 | 6 | 8.07 | 1.64 | 23.5 | −0.0773 |
| | Image surface 6 | 4 | 0.2 | | | −26 |
| Stop | | ∞ | −0.15 | | | 0 |
| Fourth lens | Object surface 8 | 2.6 | 3.26 | 1.53 | 56.1 | −10.0744 |
| | Image surface 9 | −1.445 | 0.08 | | | −0.4241 |
| Fifth lens | Object surface 10 | −1.65 | 0.634 | 1.64 | 23.5 | −0.3744 |
| | Image surface 11 | −2.33 | 0.1 | | | −7.6771 |
| Plate glass | Object surface 12 | ∞ | 0.9 | 1.52 | 64.1 | 0 |
| | Image surface 13 | ∞ | 3.06 | | | 0 |
| Image | | ∞ | | | | 0 |

All the object sides and the image sides of the second lens 120, the third lens 130, the fourth lens 150 and the fifth lens 160 are aspheric surfaces, whose shapes satisfy the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of the surface along an optical axis of the lens module at a position with a height h, c is a reciprocal of a radius of curvature of the surface, k is a conic constant, A is a coefficient of fourth level aspheric surface, B is a coefficient of sixth level aspheric surface, C is a coefficient of eighth level aspheric surface, D is a coefficient of tenth level aspheric surface, E is a coefficient of twelfth level aspheric surface, F is a coefficient of fourteenth level aspheric surface, and G is a coefficient of sixteenth level aspheric surface.

The coefficients of the aspheric surface of the second lens 120 to the fifth lens 160 in the present embodiment are listed in Table 2:

TABLE 2

| | Object surface 3 | Image surface 4 | Object surface 5 | Image surface 6 |
|---|---|---|---|---|
| A | 0.0004 | 0.022 | 0.0131 | 0.05 |
| B | 0 | −0.0024 | −0.0014 | 0.0182 |
| C | −4.522e−6 | 0 | 0.0001 | −0.0123 |
| D | 2.2297e−7 | 0 | 4.8302e−6 | −0.0028 |
| E | −4.409e−9 | −1.148e−6 | −5.319e−7 | 0.0023 |
| F | 1.5507e−11 | 2.8047e−9 | 5.8385e−10 | 0.0005 |
| G | −1.485e−13 | 3.0345e−10 | 6.2574e−10 | −0.0022 |

| | Object surface 8 | Image surface 9 | Object surface 10 | Image surface 11 |
|---|---|---|---|---|
| A | 0.0435 | 0.0002 | −0.0201 | −0.0678 |
| B | 0.0158 | 0.0337 | 0.0363 | 0.0291 |
| C | −0.0211 | −0.0094 | −0.0018 | −0.0043 |
| D | 0.0054 | 0 | −0.0013 | 0 |
| E | −0.0023 | 0.0002 | −0.0002 | 0.0001 |
| F | −0.0029 | 0.0002 | −0.0001 | 0 |
| G | 0.0012 | 0 | 0.0001 | −9.058e−6 |

Subject to the afore-mentioned design, the total focal length f of the present embodiment is 1.25 mm, the total length TTL thereof is 25.494 mm, the angle of view is 166 degrees, the focal length of the first lens 110 is −9.88 mm, the focal length of the second lens 120 is −5.16 mm, the focal length of the third lens 130 is 31.81 mm, the focal length of the fourth lens 150 is 2.41 mm, and the focal length of the fifth lens 160 is −13.8 mm.

Thereby, the system has a good refractive power arrangement and can effectively modify the aberration of the wide-angle system. Such arrangement also enables the lens module 100 to have excellent and consistent image quality in the environment having severe temperature changes. Test results of which are shown in FIGS. 1A-1D.

Since the fourth lens 150 has two convex surfaces on both sides respectively, the radii of curvature of the convex surfaces need to coordinate with each other, preferably satisfying the following relationship: $2 < (r_8 - r_9)/(r_8 + r_9) < 4.2$, in which $r_8$ is a radius of curvature of the object side of the fourth lens 150, and $r_9$ is a radius of curvature of the image side of the fourth lens 150. In the present embodiment, $(r_8 - r_9)/(r_8 + r_9)$ is 3.5 and satisfies the abovementioned relationship. Therefore, the incident angle of lights incident on the fourth lens 150 from the stop 140 is smaller, which is helpful for the reduction of system sensitivity.

Since the first lens 110 has a concave surface on the image side, and the second lens 120 also has a concave surface on the object side, the radii of curvature thereof need to coordinate with each other, preferably satisfying the following relationship: $-12 < (r_2 - r_3)/(r_2 + r_3) < -2$, in which $r_2$ is a radius of curvature of the image side of the first lens 110, $r_3$ is a radius of curvature of the object side of the second lens 120. When $(r_2 - r_3)/(r_2 + r_3)$ satisfies the aforementioned relationship, the system aberration can be modified and the resolving power can be elevated. In addition, the incident angle of lights incident on the second lens 120 from the first lens 110 can be lowered, and thus the lights can be refracted smoother so as to reduce the system sensitivity. If $(r_2 - r_3)/(r_2 + r_3)$ were higher than the upper range value of the aforementioned relationship, the system aberration would become higher. If $(r_2 - r_3)/(r_2 + r_3)$ were smaller than the lower range value of the aforementioned relationship, the lights would be refracted at wider angles and thus increase the system sensitivity. In the present embodiment, $(r_2 - r_3)/(r_2 + r_3)$ is −6.7 and satisfies the aforementioned relationship.

To further modify the aberration caused by marginal rays, the total focal length and the distance between the second lens 120 and the third lens 130 need to coordinate with each other, preferably satisfying the following the relationship: $0.6 < d_4/f < 1$, in which $d_4$ is a distance from the image side of the second lens 120 to the object side of the third lens 130 along an optical axis of the five-piece wide-angle lens module 100, f is a total focal length of the five-piece wide-angle lens module 100. If $d_4/f$ were higher than the upper range value of the aforementioned relationship, the system aberration would become higher. On the other hand, if $d_4/f$ were smaller than the lower range value of the aforementioned relationship, the aberration caused by margin rays would not be adequately modified, and the resolving quality would become worse. In the present embodiment, $d_4/f$ is 0.9 and satisfies the aforementioned relationship.

To further modify the system aberration and increase the image quality, the total focal length and the distance between the fourth lens 150 and the fifth lens 160 need to coordinate with each other, preferably satisfying the following relationship: $0 < d_9/f < 0.2$, in which $d_9$ is a distance from the image side of the fourth lens 140 to the object side of the fifth lens 150 along an optical axis of the five-piece wide-angle lens module 100, f is a focal length of the five-piece wide-angle lens module 100. If $d_9/f$ were higher than the upper range value of the aforementioned relationship, the fourth lens 150 and the fifth lens 160 could not modify the aberration of the wide-angle system. Since the distance between the fourth and fifth lenses 150 and 160 would not be smaller than or equal to 0, $d_9/f$ would not be smaller than or equal to 0 as well. More preferably, $d_9/f$ further satisfies the following relationship: $0<d_9/f<0.08$, so as to acquire better system resolving quality. In other words, the fifth lens 160 is preferably disposed as close to the fourth lens 150 as possible. In the present embodiment, $d_9/f$ is 0.064 and satisfies the abovementioned relationships.

Figure 1E:
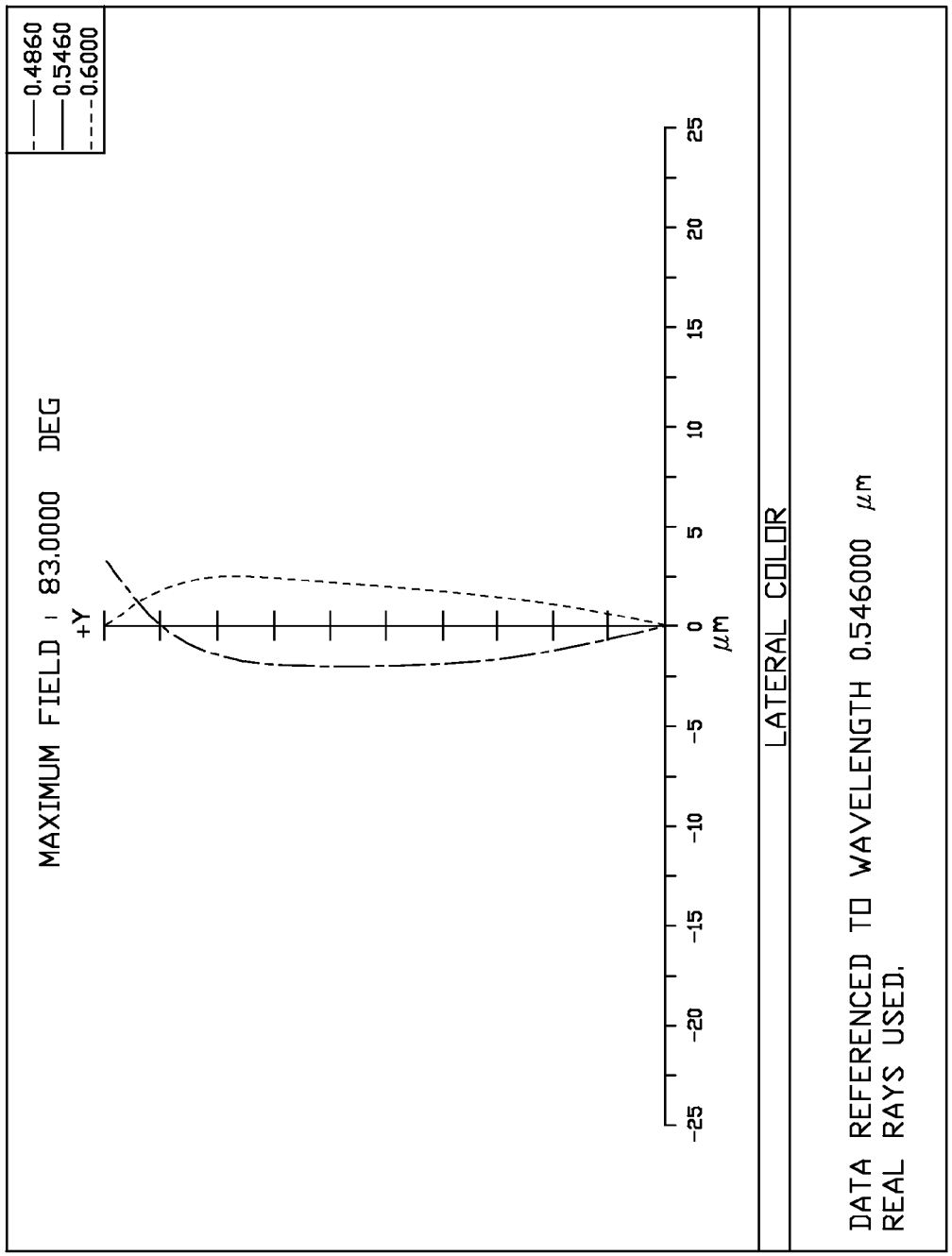

To mitigate the problem that a wide-angle system tends to have lateral color aberration, the Abbe numbers of the fourth lens 150 and the fifth lens 160 need to coordinate with each other, preferably satisfying the following relationship: $Vd_4-Vd_5>25$, in which $Vd_4$ is the Abbe number of the fourth lens 150, and $Vd_5$ is the Abbe number of the fifth lens 160. In the present embodiment, $Vd_4-Vd_5$ is 32.6, which satisfies the above-mentioned relationship, and therefore the lateral color aberration can be modified. A test result of which is shown in FIG. 1E.

Figure 2:
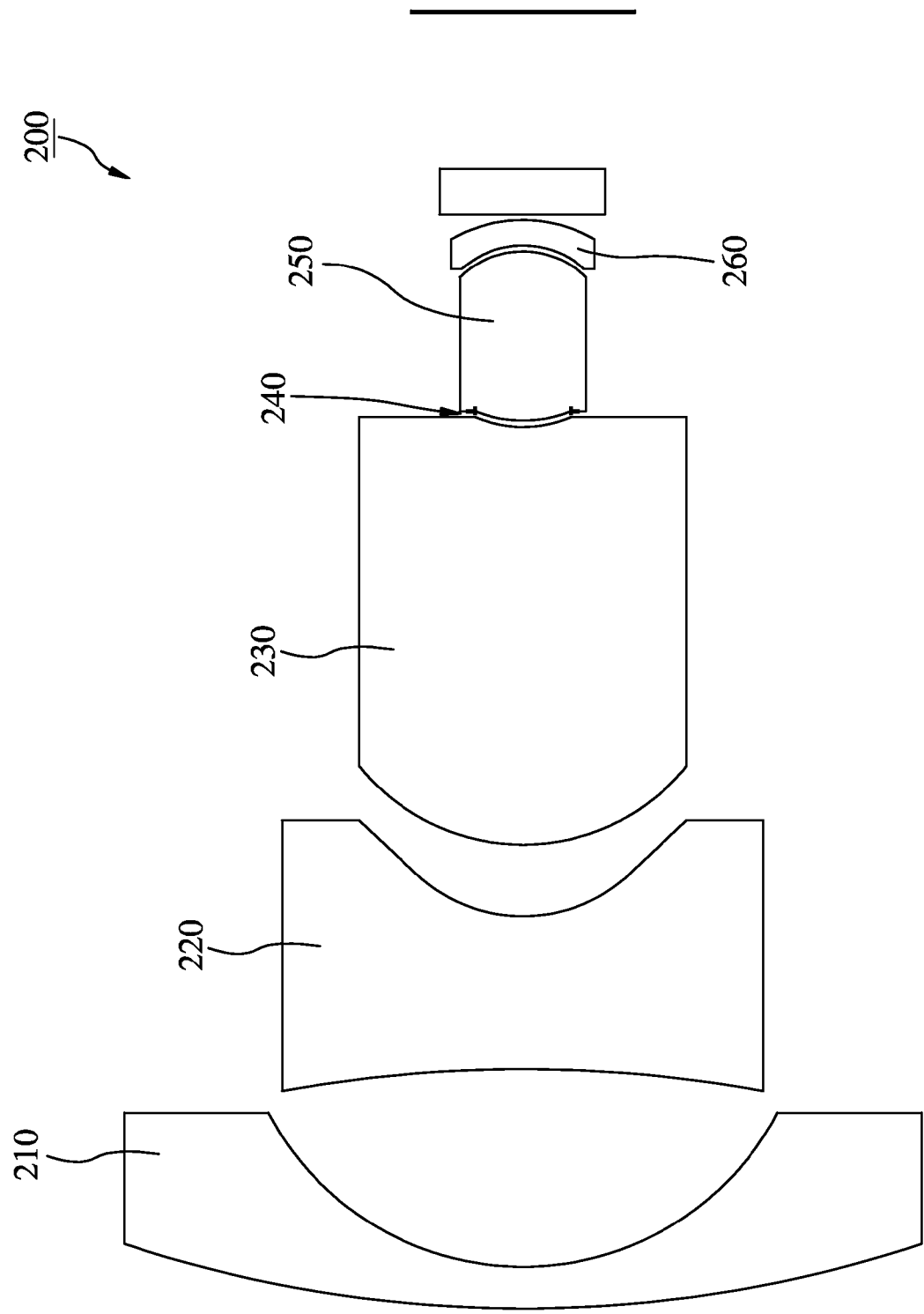
FIG. 2 is a schematic view of a lens module in accordance with the second embodiment of the present invention.
Figure 2A:
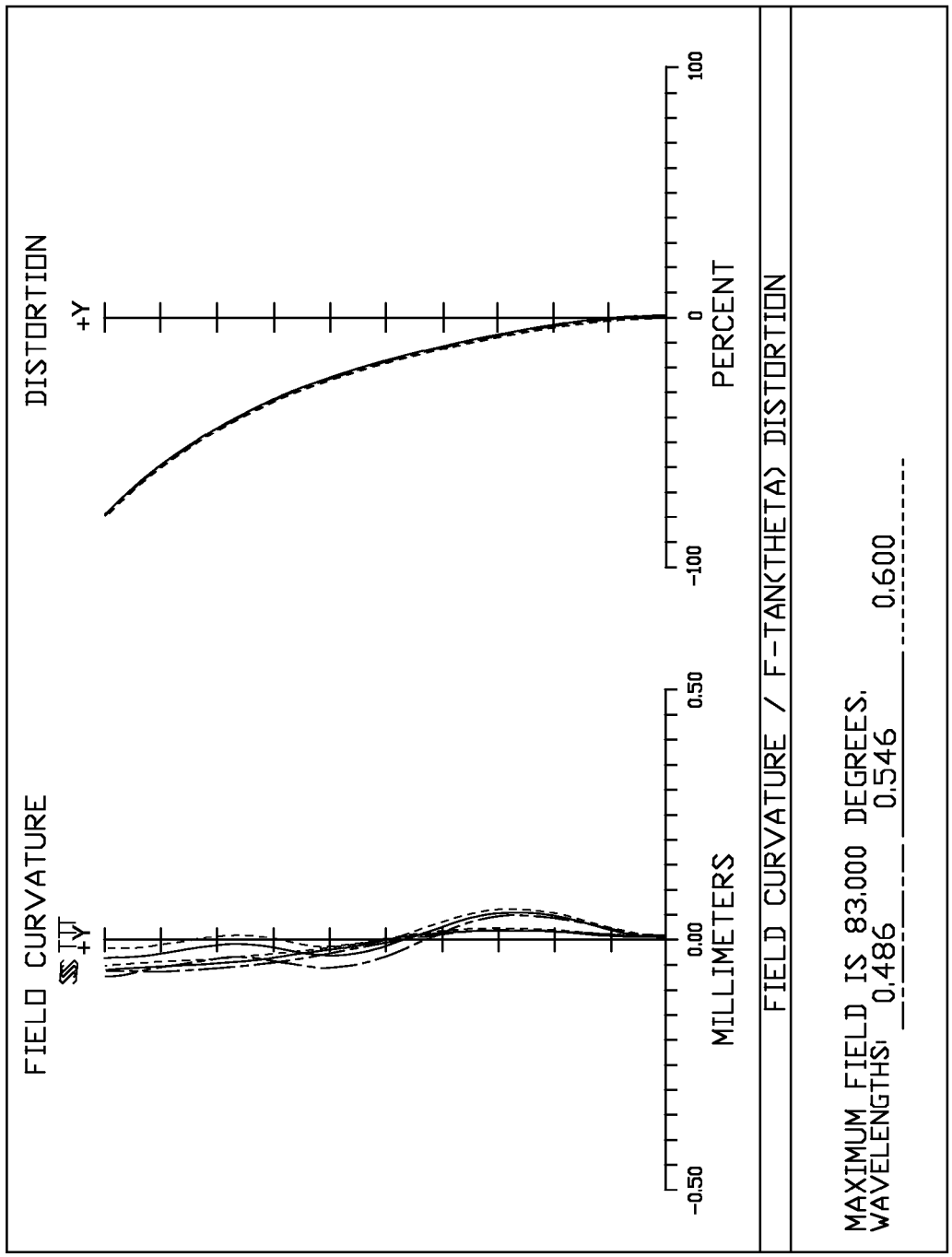
FIG. 2A is a diagram showing the field curvature and the distortion of the lens module in accordance with the second embodiment of the present invention.
Figure 2B:
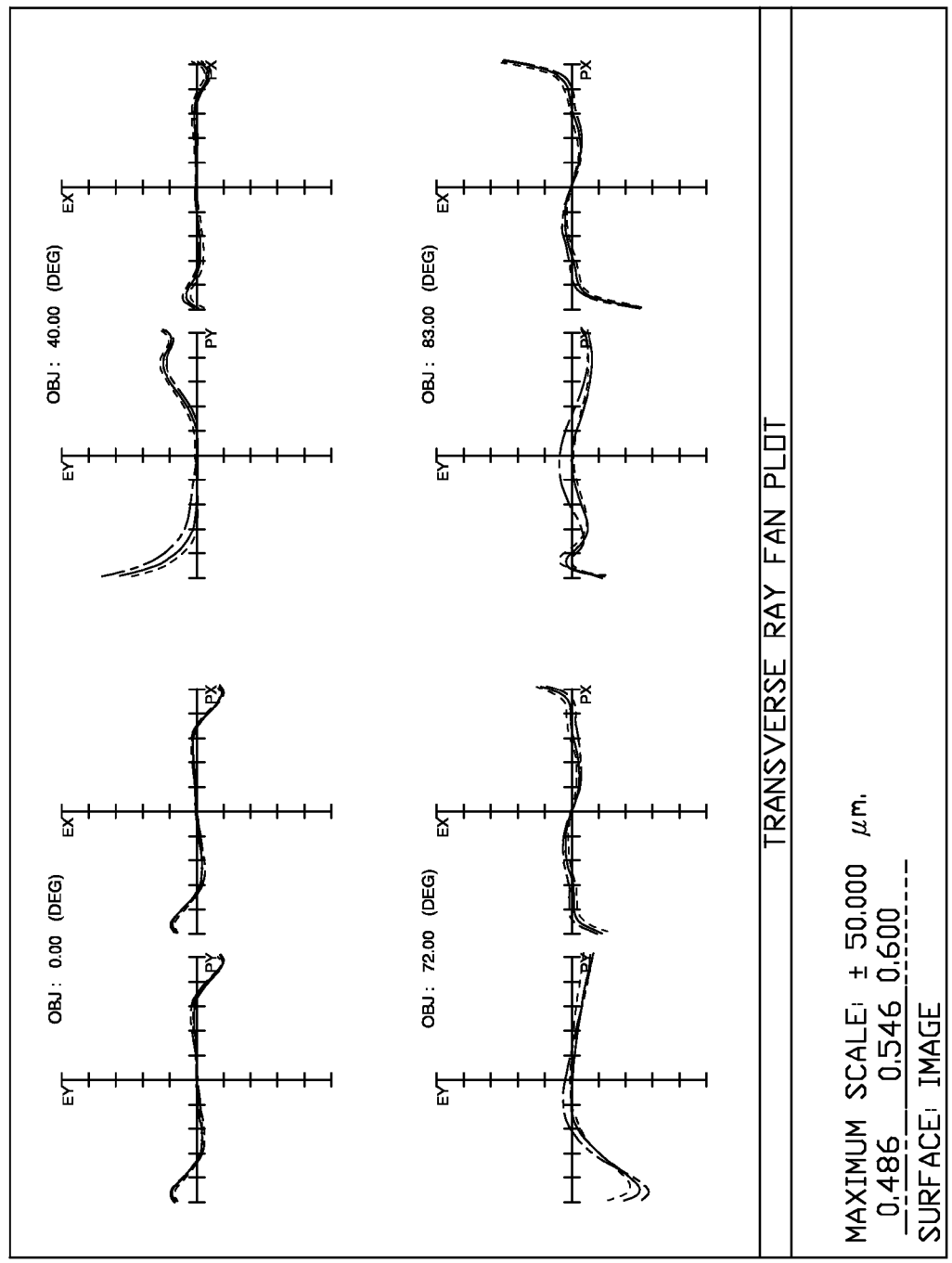
FIG. 2B is a diagram showing the transverse ray fan plot of the lens module in accordance with the second embodiment of the present invention at 25° C.
Figure 2C:
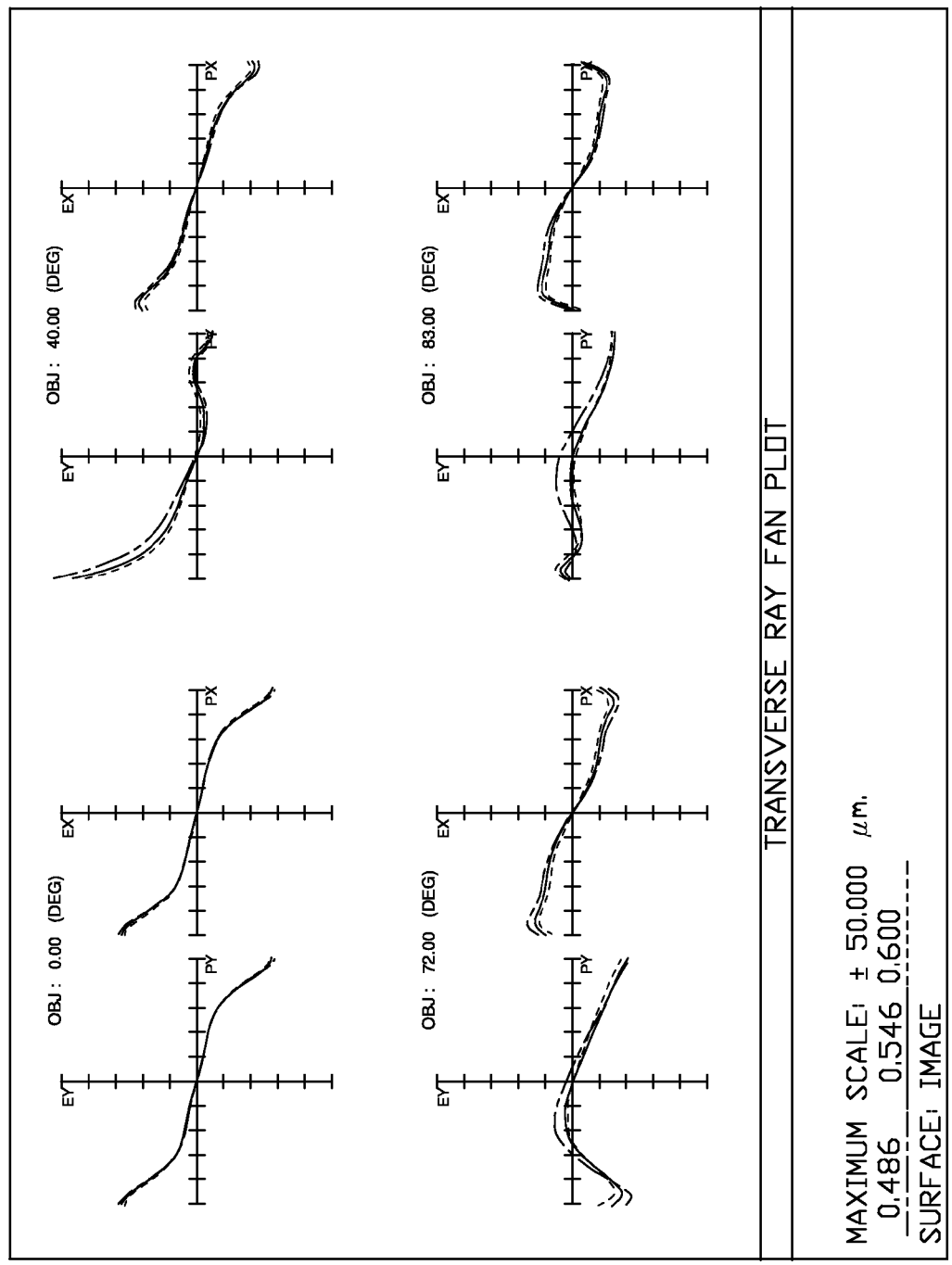
FIG. 2C is a diagram showing the transverse ray fan plot of the lens module in accordance with the second embodiment of the present invention at −50° C.
Figure 2D:
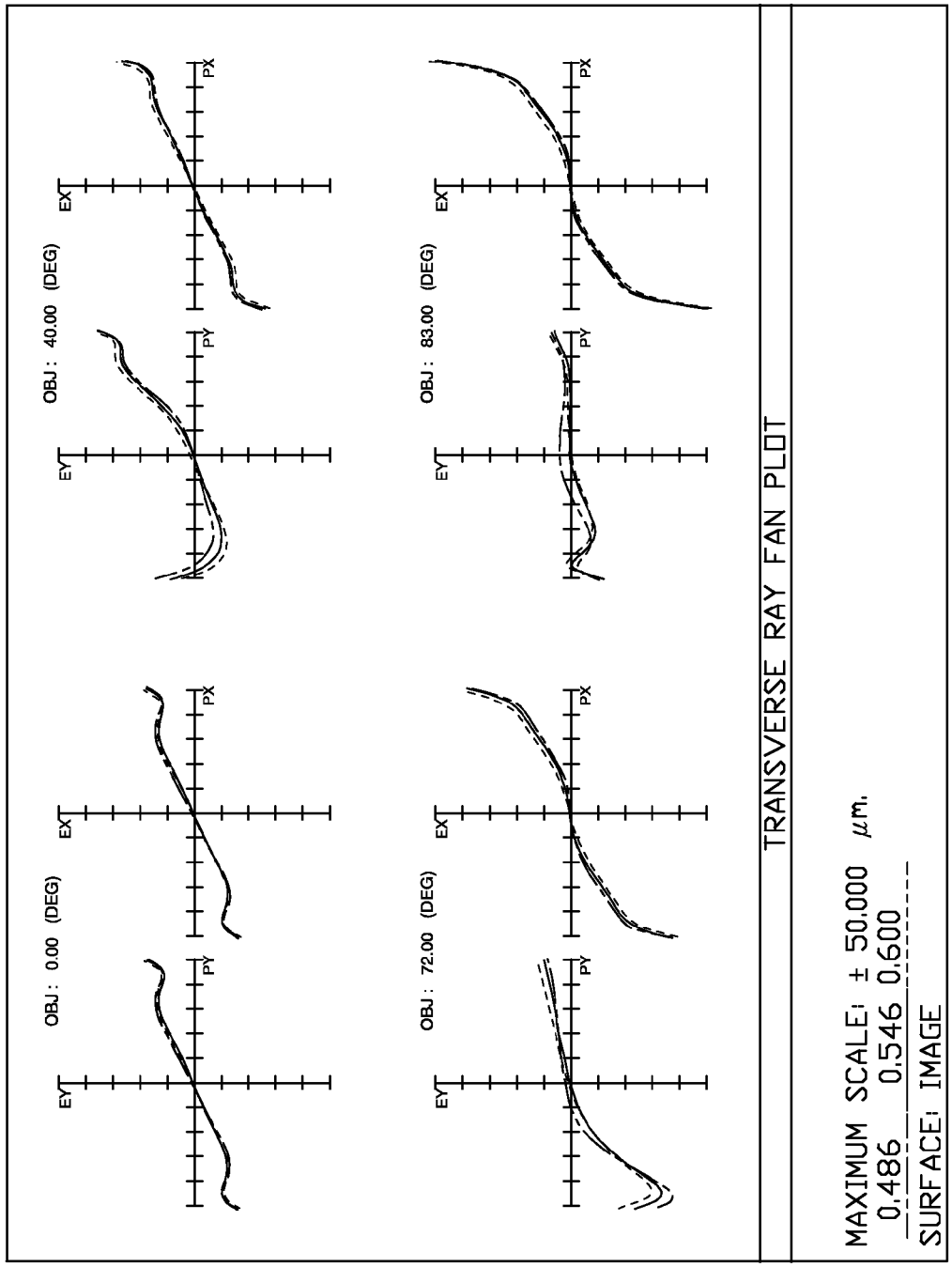
FIG. 2D is a diagram showing the transverse ray fan plot of the lens module in accordance with the second embodiment of the present invention at 100° C.

Please refer to FIG. 2 for a five-piece wide-angle lens module 200 in accordance with the second embodiment of the present invention. The structural arrangement of the second embodiment is similar to that of the first embodiment, and the optical feature data thereof are listed in Table 3:

TABLE 3

| Lens | Surface | Radius | Thickness | Nd | Vd | Conic |
|---|---|---|---|---|---|---|
| Object | | ∞ | ∞ | | | 0 |
| First lens | Object surface 1 | 25 | 0.85 | 1.834 | 42.7 | 0 |
| | Image surface 2 | 5.62 | 3.792 | | | 0 |
| Second lens | Object surface 3 | −15 | 3.035 | 1.53 | 56.1 | −42 |
| | Image surface 4 | 4.66 | 1.35 | | | 0.7846 |
| Third lens | Object surface 5 | 5.66 | 8.134 | 1.64 | 23.5 | −0.2142 |
| | Image surface 6 | 3.9 | 0.25 | | | −19.6 |
| Stop | | ∞ | −0.156 | | | 0 |
| Fourth lens | Object surface 8 | 2.606 | 3.304 | 1.53 | 56.1 | −8.6914 |
| | Image surface 9 | −1.436 | 0.08 | | | −0.4216 |
| Fifth lens | Object surface 10 | −1.615 | 0.518 | 1.64 | 23.5 | −0.3403 |
| | Image surface 11 | −2.33 | 0.098 | | | −7.05 |
| Plate glass | Object surface 12 | ∞ | 0.9 | 1.52 | 64.1 | 0 |
| | Image surface 13 | ∞ | 3.0342 | | | 0 |
| Image | | ∞ | | | | 0 |

Likewise, all the object sides and the image sides of the second lens 220, the third lens 230, the fourth lens 250 and the fifth lens 260 are aspheric surfaces and satisfy the above-mentioned shape formula, the coefficients of the aspheric surface thereof are listed in Table 4:

TABLE 4

| | Object surface 3 | Image surface 4 | Object surface 5 | Image surface 6 |
|---|---|---|---|---|
| A | 0.0005 | 0.0222 | 0.0129 | 0.0538 |
| B | 0 | −0.0023 | −0.0014 | 0.0185 |
| C | −4.722e−6 | 0 | 0.0001 | −0.0117 |
| D | 2.1588e−7 | 0 | 4.7618e−6 | −0.0027 |
| E | −3.972e−9 | −1.133e−6 | −5.209e−7 | 0.0028 |
| F | 2.3865e−11 | 4.482e−9 | 1.8567e−10 | 0.0004 |
| G | −3.437e−13 | 2.5236e−10 | 6.2452e−10 | −0.0019 |

| | Object surface 8 | Image surface 9 | Object surface 10 | Image surface 11 |
|---|---|---|---|---|
| A | 0.0467 | 0.0004 | −0.0222 | −0.0686 |
| B | 0.0175 | 0.0334 | 0.0358 | 0.0293 |
| C | −0.0202 | −0.0096 | −0.0014 | −0.0042 |
| D | 0.0055 | 0 | −0.001 | 4.7264e−6 |
| E | −0.0032 | 0.0004 | −0.0002 | 0.0001 |
| F | −0.0026 | 0.0002 | −0.0002 | 0 |
| G | 0.0019 | 0 | 0.0002 | −7.121e6 |

Based on the above-mentioned design, the total focal length f of the present embodiment is 1.37 mm, the total length TTL thereof is 25.1892 mm, the angle of view thereof is 166 degrees, the focal length of the first lens 210 is −8.81 mm, the focal length of the second lens 220 is −6.28 mm, the focal length of the third lens 230 is 23.85 mm, the focal length of the fourth lens 250 is 2.41 mm, and the focal length of the fifth lens 260 is −11.38 mm.

Thereby, the system has a good refractive power arrangement and can effectively modify the aberration of the wide-angle system. Such arrangement also enables the lens module 200 to have excellent and consistent image quality in the environment having severe temperature changes. Test results of which are shown in FIGS. 2A-2D.

In the present embodiment, $(r_8-r_9)/(r_8+r_9)$ is 3.45 and satisfies the relationship of $2<(r_8-r_9)/(r_8+r_9)<4.2$. Therefore, the incident angle of lights incident on the fourth lens 250 from the stop 240 is smaller, which is helpful for the reduction of the system sensitivity.

In the present embodiment, $(r_2-r_3)(r_2+r_3)$ is −2.2 and satisfies the relationship of $-12<(r_2-r_3)/(r_2+r_3)<-2$. Therefore, the system aberration is modified and the system resolving power is elevated. In addition, the incident angle of lights incident on the second lens 220 from the first lens 210 can be lowered, and thus the lights can be refracted smoother so as to reduce the system sensitivity.

In the present embodiment, $d_4/f$ is 0.99 and satisfies the relationship of $0.6<d_4/f<1$. Therefore, the aberration caused by margin rays can be mitigated.

In the present embodiment, $d_9/f$ is 0.058 and satisfies the relationships of $0<d_9/f<0.2$ and $0<d_9/f<0.08$. Therefore, the system aberration can be modified, and the image quality can be elevated.

Figure 2E:
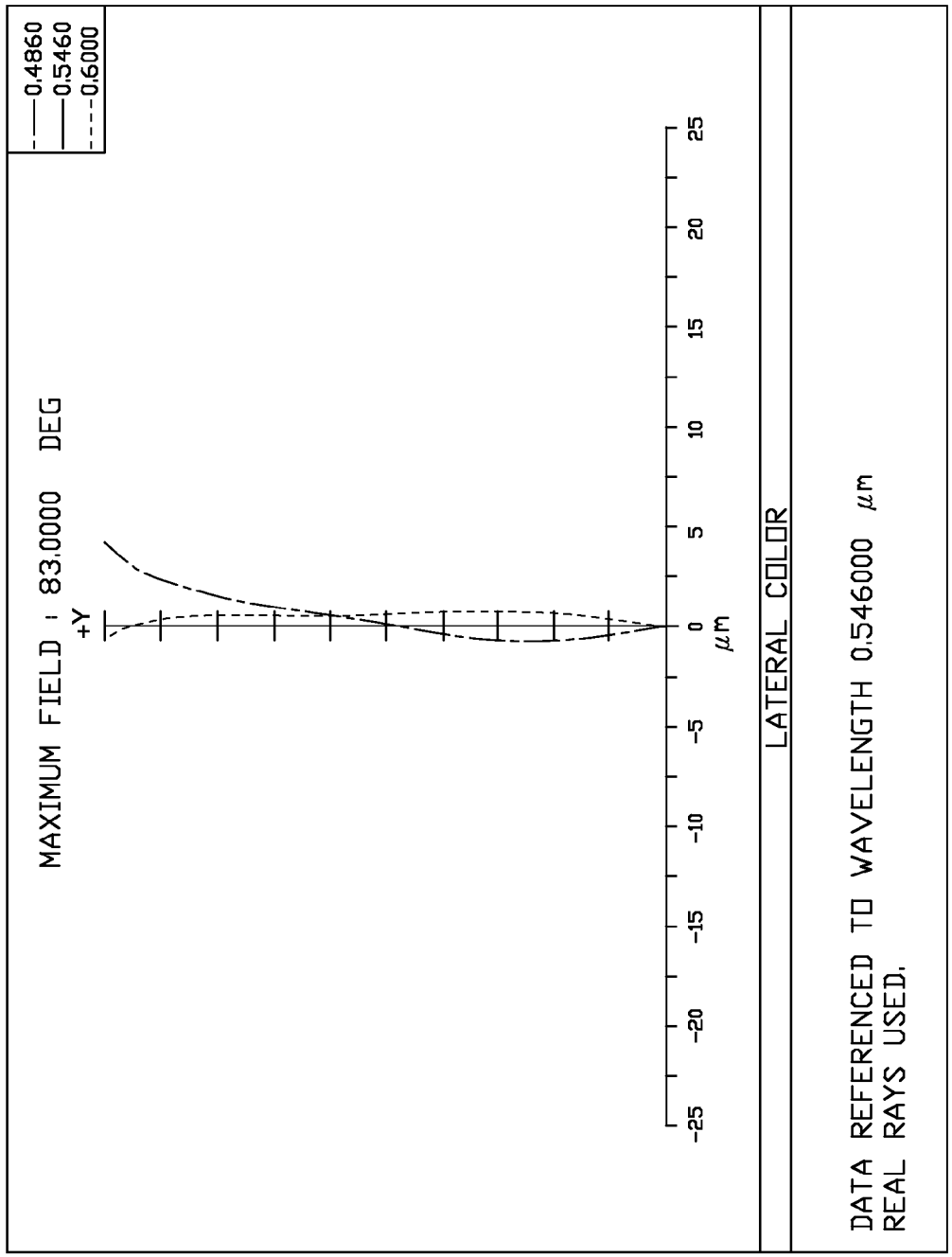
FIG. 2E is a diagram showing the lateral color aberration of the lens module in accordance with the second embodiment of the present invention.

In the present embodiment, $Vd_4-Vd_5$ is 32.6 and satisfies the relationship of $Vd_4-Vd_5>25$. Therefore, the lateral color aberration of the system can be modified. A test result of which is shown in FIG. 2E.

Figure 3:
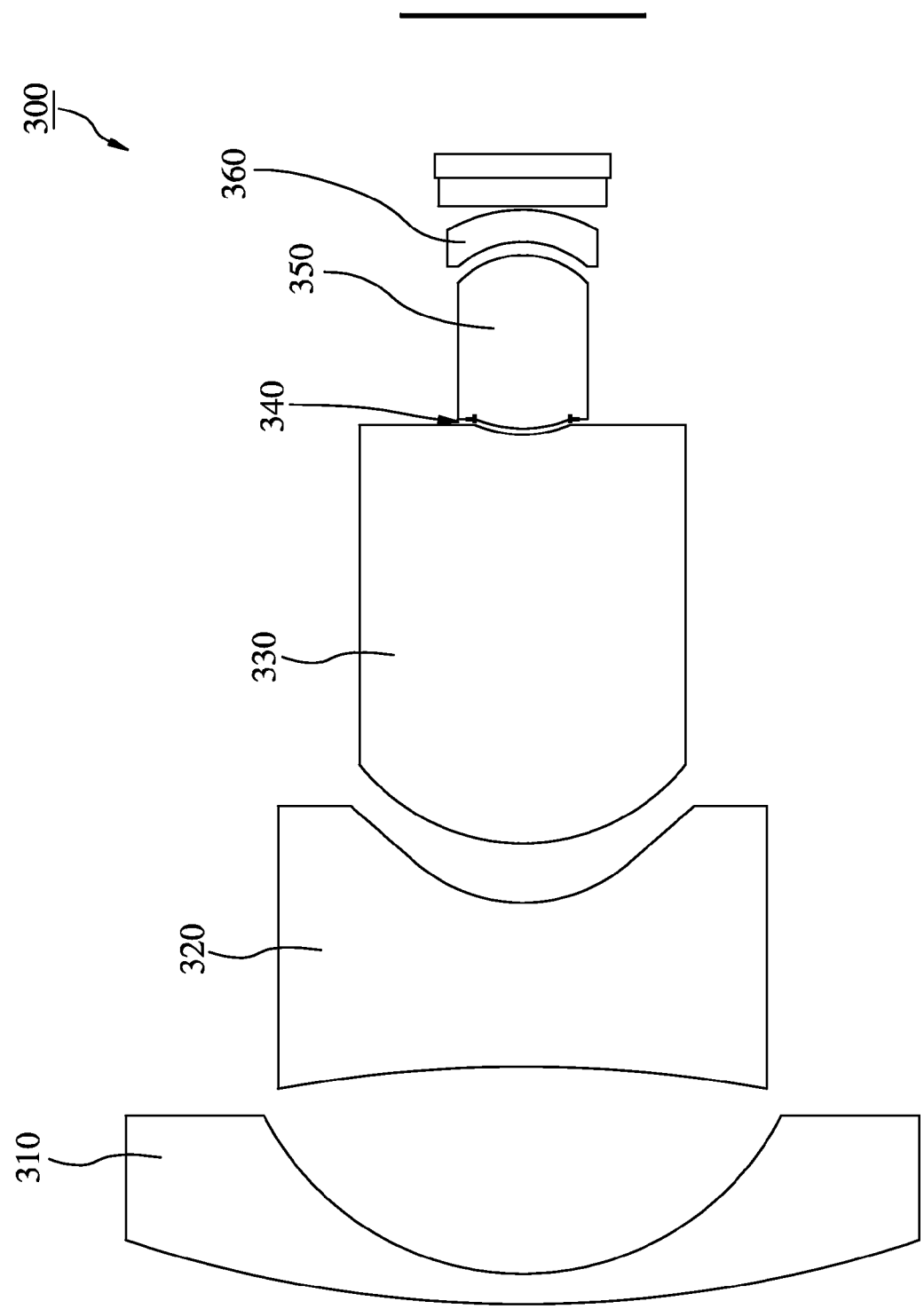
FIG. 3 is a schematic view of a lens module in accordance with the third embodiment of the present invention.
Figure 3A:
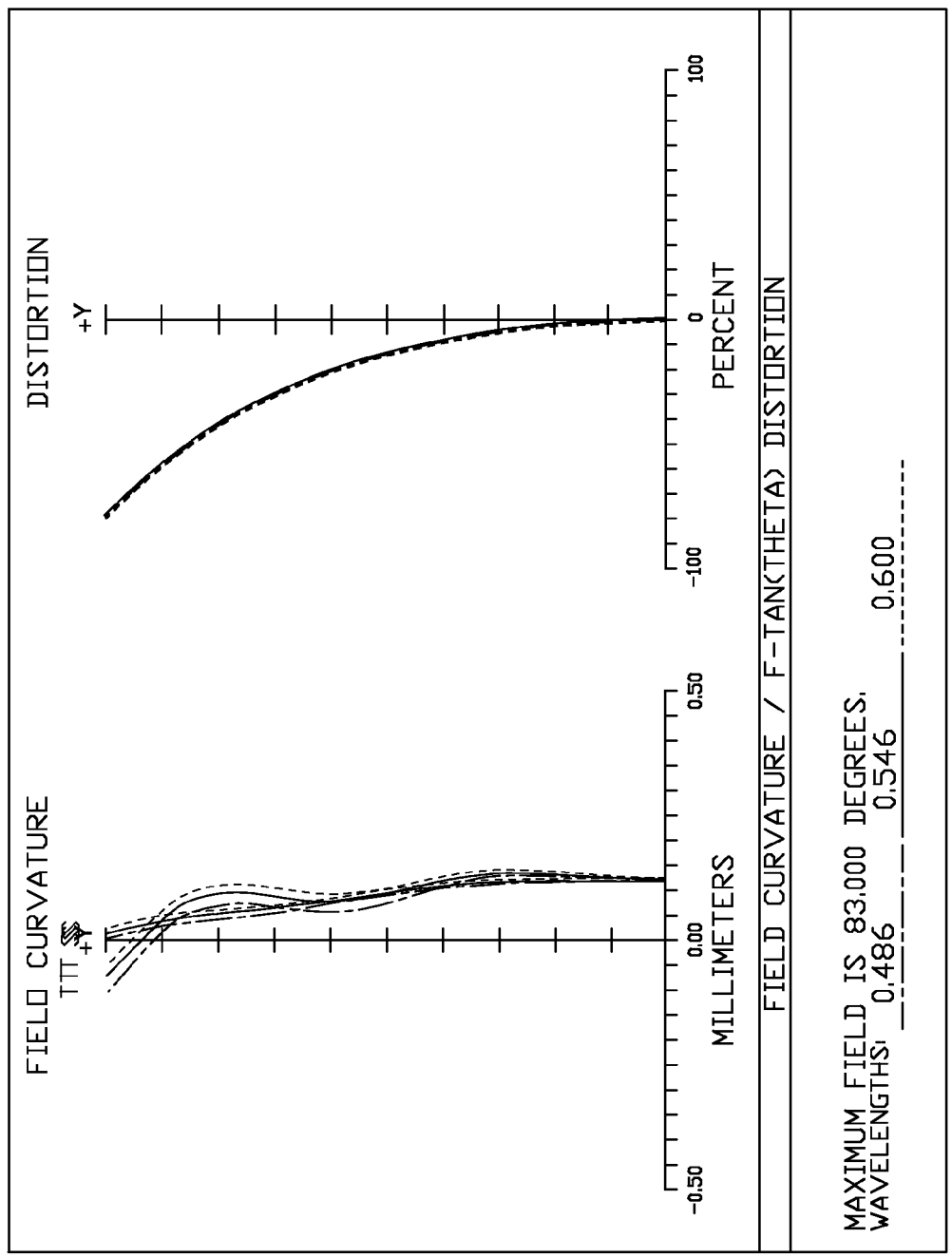
FIG. 3A is a diagram showing the field curvature and the distortion of the lens module in accordance with the third embodiment of the present invention.
Figure 3B:
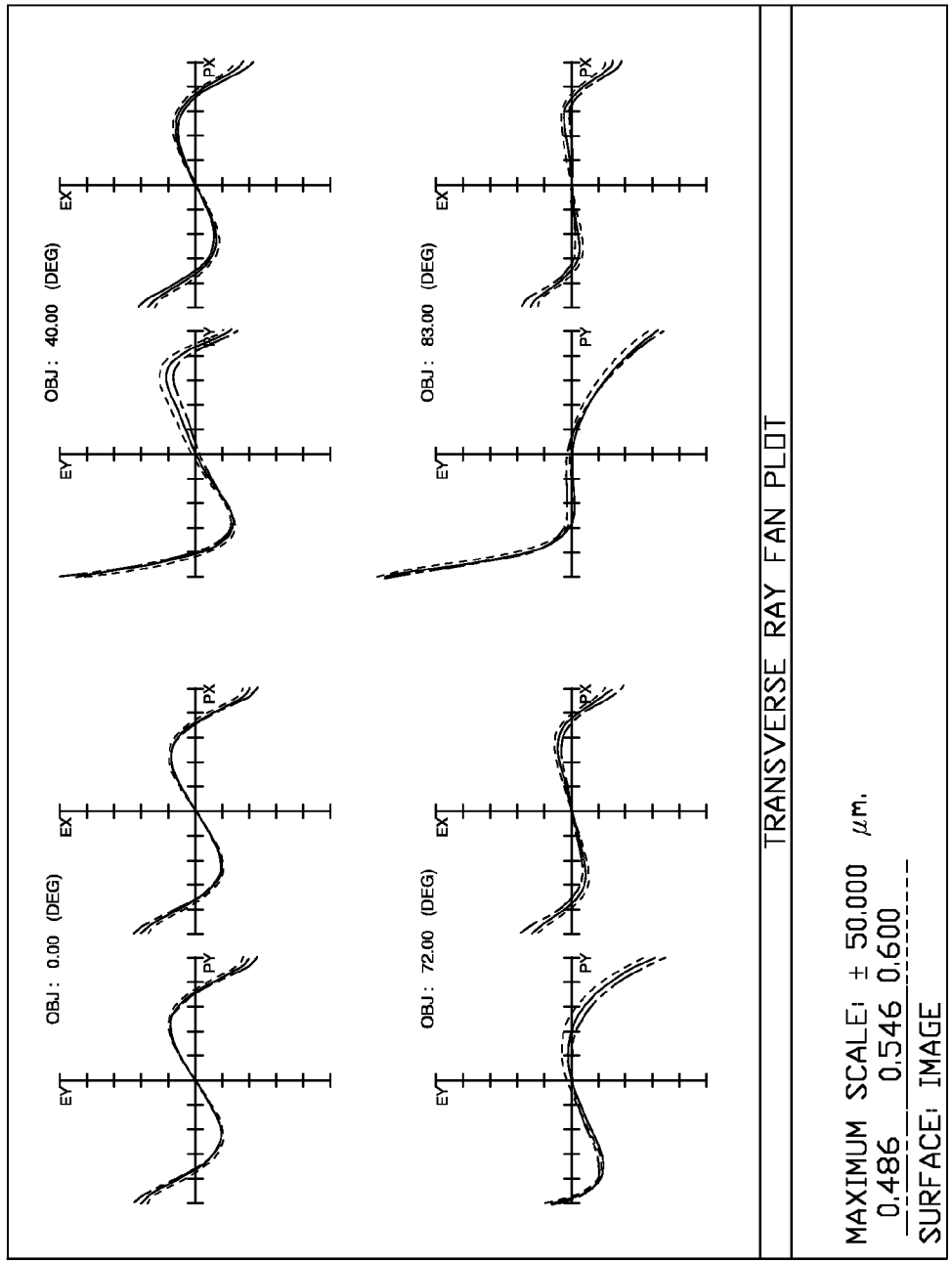
FIG. 3B is a diagram showing the transverse ray fan plot of the lens module in accordance with the third embodiment of the present invention at 25° C.
Figure 3C:
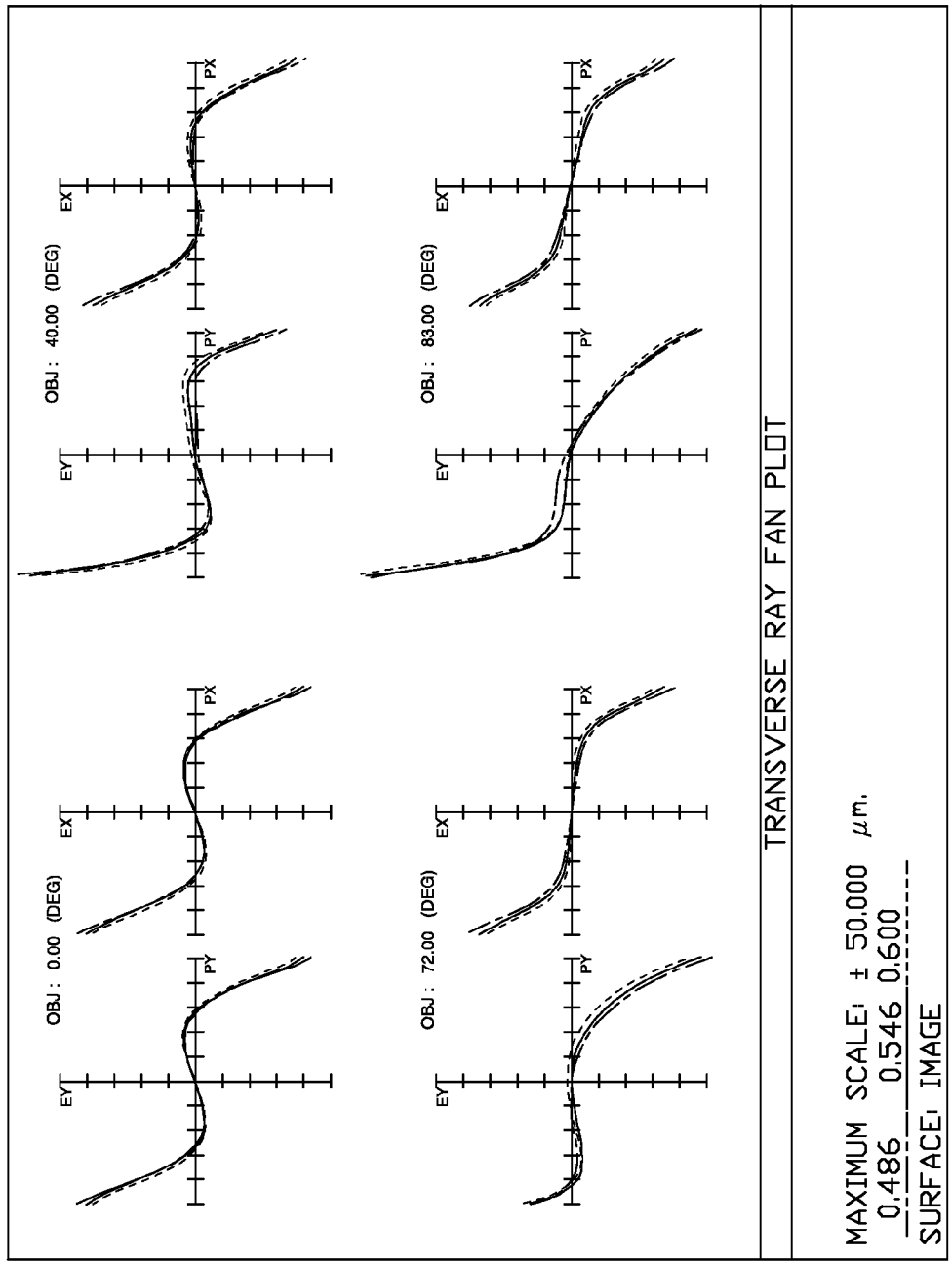
FIG. 3C is a diagram showing the transverse ray fan plot of the lens module in accordance with the third embodiment of the present invention at −50° C.
Figure 3D:
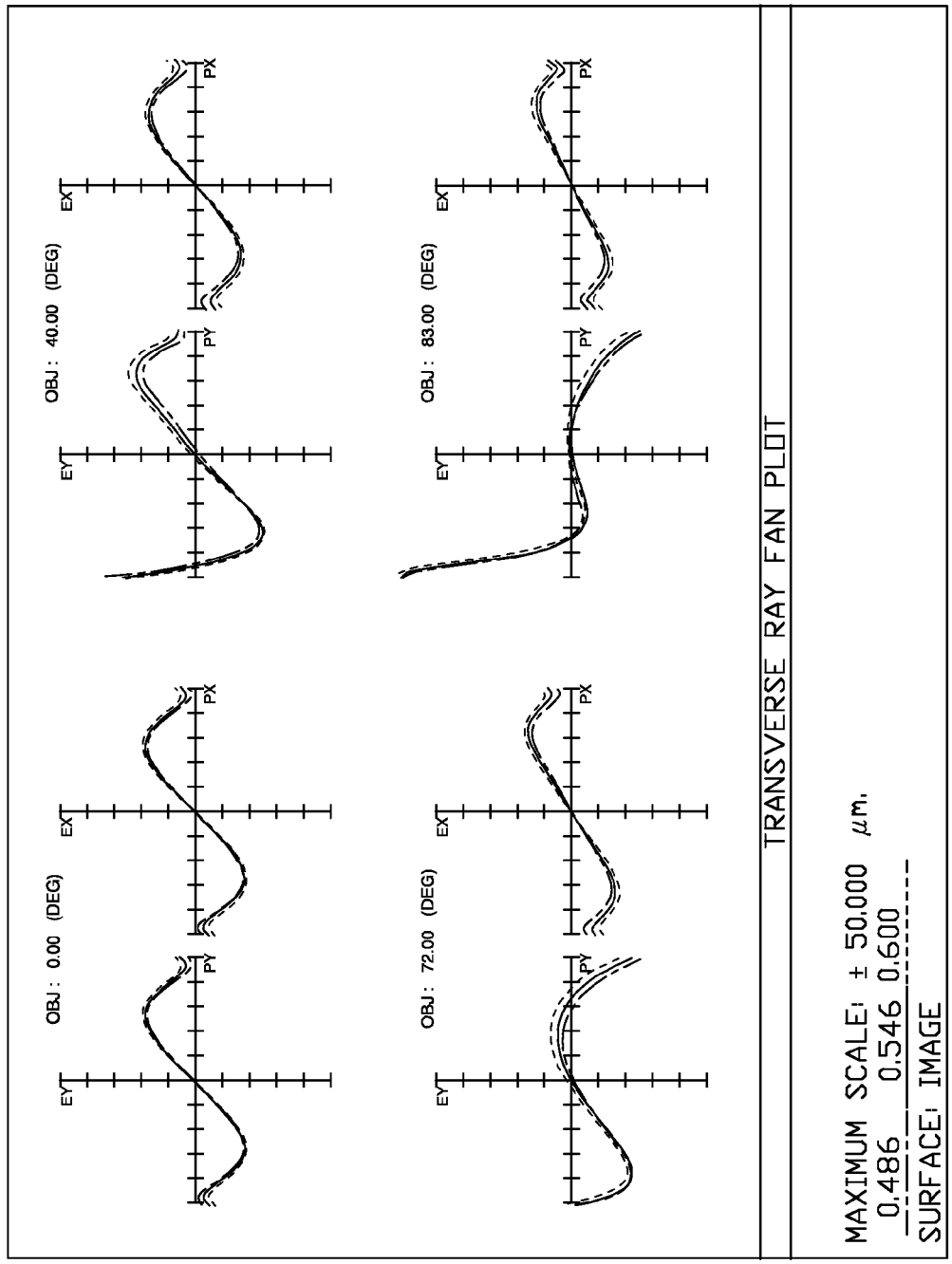
FIG. 3D is a diagram showing the transverse ray fan plot of the lens module in accordance with the third embodiment of the present invention at 100° C.

Please refer to FIG. 3 for a five-piece wide-angle lens module 300 in accordance with the third embodiment of the present invention. The structural arrangement of the third embodiment is similar to that of the first embodiment, and the optical feature data thereof are listed in Table 5:

TABLE 5

| Lens | Surface | Radius | Thickness | Nd | Vd | Conic |
|---|---|---|---|---|---|---|
| Object | | ∞ | ∞ | | | 0 |
| First lens | Object surface 1 | 23.2 | 0.6 | 1.834 | 42.7 | 0 |
| | Image surface 2 | 5.5 | 3.83 | | | 0 |
| Second lens | Object surface 3 | −9.6 | 3.11 | 1.53 | 56.1 | −50 |
| | Image surface 4 | 4.8 | 1.08 | | | 0.9 |
| Third lens | Object surface 5 | 5.5 | 7.6 | 1.64 | 23.5 | −0.1 |
| | Image surface 6 | 3.81 | 0.23 | | | −22 |
| Stop | | ∞ | −0.15 | | | 0 |
| Fourth lens | Object surface 8 | 2.57 | 3.24 | 1.53 | 56.1 | −10.2 |
| | Image surface 9 | −1.43 | 0.25 | | | −0.42 |
| Fifth lens | Object surface 10 | −1.64 | 0.63 | 1.64 | 23.5 | −0.38 |
| | Image surface 11 | −2.34 | 0.1 | | | −7.7 |
| Plate glass | Object surface 12 | ∞ | 0.9 | 1.52 | 64.1 | 0 |
| | Image surface 13 | ∞ | 2.6 | | | 0 |
| Image | | ∞ | | | | 0 |

Likewise, all the object sides and the image sides of the second lens 320, the third lens 330, the fourth lens 350 and the fifth lens 360 are aspheric surfaces and satisfy the above-mentioned shape formula, the coefficients of the aspheric surface thereof are listed in Table 6:

TABLE 6

| | Object surface 3 | Image surface 4 | Object surface 5 | Image surface 6 |
|---|---|---|---|---|
| A | 0.0004 | 0.0219 | 0.0131 | 0.05 |
| B | 0 | −0.0024 | −0.0014 | 0.0181 |
| C | −4.527e−6 | 0 | 0.0001 | −0.0124 |
| D | 2.2284e−7 | 0 | 4.8288e−6 | −0.0029 |
| E | −4.42e−9 | −1.148e−6 | −5.322e−7 | 0.0022 |
| F | 1.5281e−11 | 2.9203e−9 | 5.8715e−10 | 0.0005 |
| G | 1.7346e−13 | 3.1797e−10 | 6.3015e−10 | −0.002 |

| | Object surface 8 | Image surface 9 | Object surface 10 | Image surface 11 |
|---|---|---|---|---|
| A | 0.0435 | 0.0002 | −0.0201 | −0.0678 |
| B | 0.0158 | 0.0337 | 0.0363 | 0.0291 |
| C | −0.0211 | −0.0094 | −0.0018 | −0.0045 |
| D | 0.0054 | 0 | −0.0014 | −9.958e−6 |
| E | −0.0023 | 0.0002 | −0.0002 | 0.0001 |
| F | −0.003 | 0.0002 | −0.0001 | 0 |
| G | 0.0011 | −6.455e−6 | 0.0001 | −9.147e6 |

Based on the above-mentioned design, the total focal length f of the present embodiment is 1.29 mm, the total length TTL thereof is 24.02 mm, the angle of view thereof is 166 degrees, the focal length of the first lens 310 is −8.72 mm, the focal length of the second lens 320 is −5.54 mm, the focal length of the third lens 330 is 25.08 mm, the focal length of the fourth lens 350 is 2.39 mm, and the focal length of the fifth lens 360 is −13.12 mm.

Thereby, the system has a good refractive power arrangement and can effectively modify the aberration of the wide-angle system. Such arrangement also enables the lens module 300 to have excellent and consistent image quality in the environment having severe temperature changes. Test results of which are shown in FIGS. 3A-3D.

In the present embodiment, $(r_8-r_9)/(r_8+r_9)$ is 3.51 and satisfies the relationship of $2<(r_8-r_9)/(r_8+r_9)<4.2$. Therefore, the incident angle of lights incident on the fourth lens 350 from the stop 340 is smaller, which is helpful for the reduction of the system sensitivity.

In the present embodiment, $(r_2-r_3)/(r_2+r_3)$ is −3.68 and satisfies the relationship of $-12<(r_2-r_3)/(r_2+r_3)<-2$. Therefore, the system aberration is modified and the system resolving power is elevated. In addition, the incident angle of lights incident on the second lens 320 from the first lens 310 can be lowered, and thus the lights can be refracted smoother so as to reduce the system sensitivity.

In the present embodiment, $d_4/f$ is 0.84 and satisfies the relationship of $0.6<d_4/f<1$. Therefore, the aberration caused by margin rays can be mitigated.

In the present embodiment, $d_9/f$ is 0.194 and satisfies the relationship of $0<d_9/f<0.2$. Therefore, the system aberration can be modified, and the image quality can be elevated.

Figure 3E:
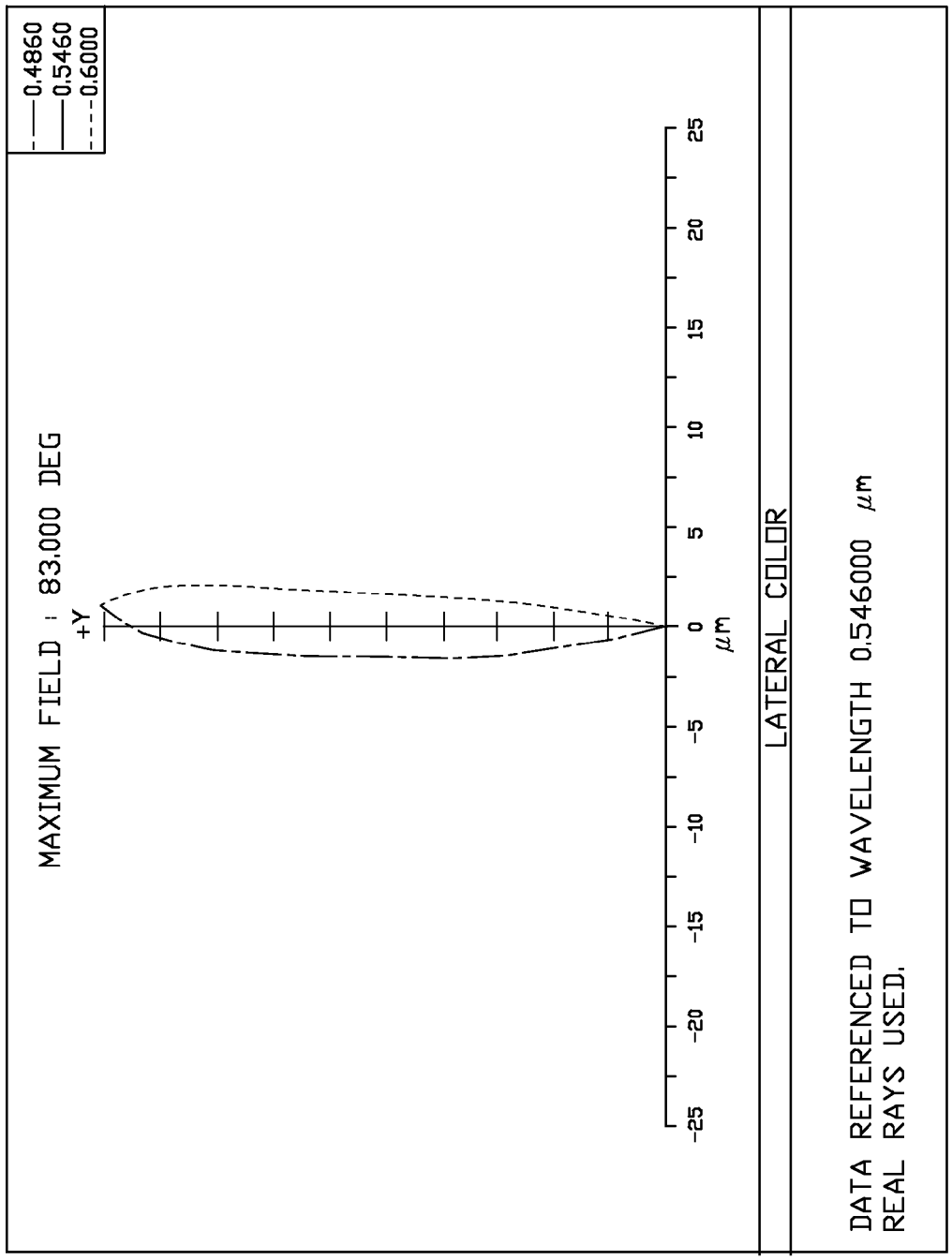
FIG. 3E is a diagram showing the lateral color aberration of the lens module in accordance with the third embodiment of the present invention.

In the present embodiment, $Vd_4-Vd_5$ is 32.6 and satisfies the relationship of $Vd_4-Vd_5>25$. Therefore, the lateral color aberration of the system can be modified. A test result of which is shown in FIG. 3E.

Figure 4:
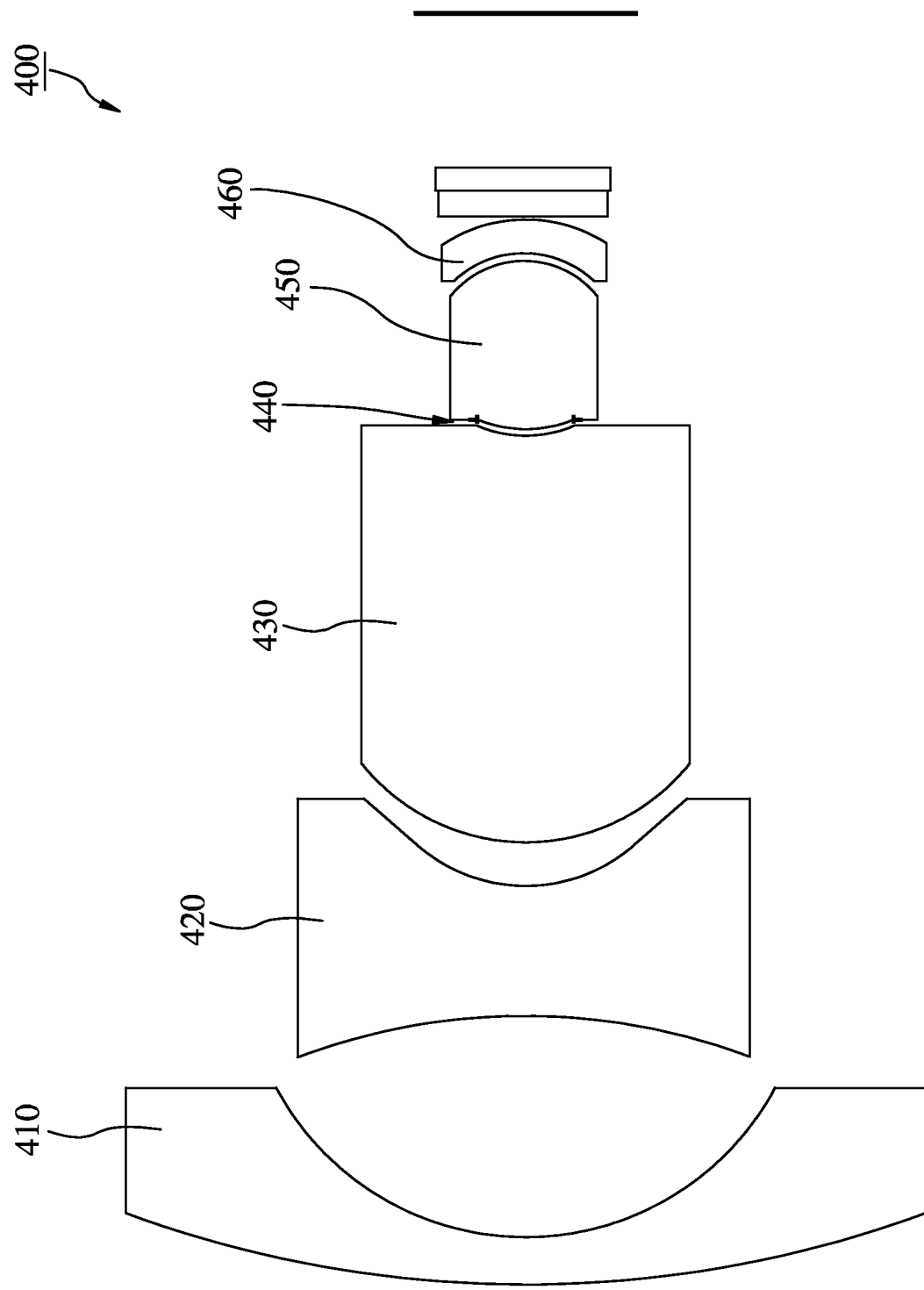
FIG. 4 is a schematic view of a lens module in accordance with the fourth embodiment of the present invention.
Figure 4A:
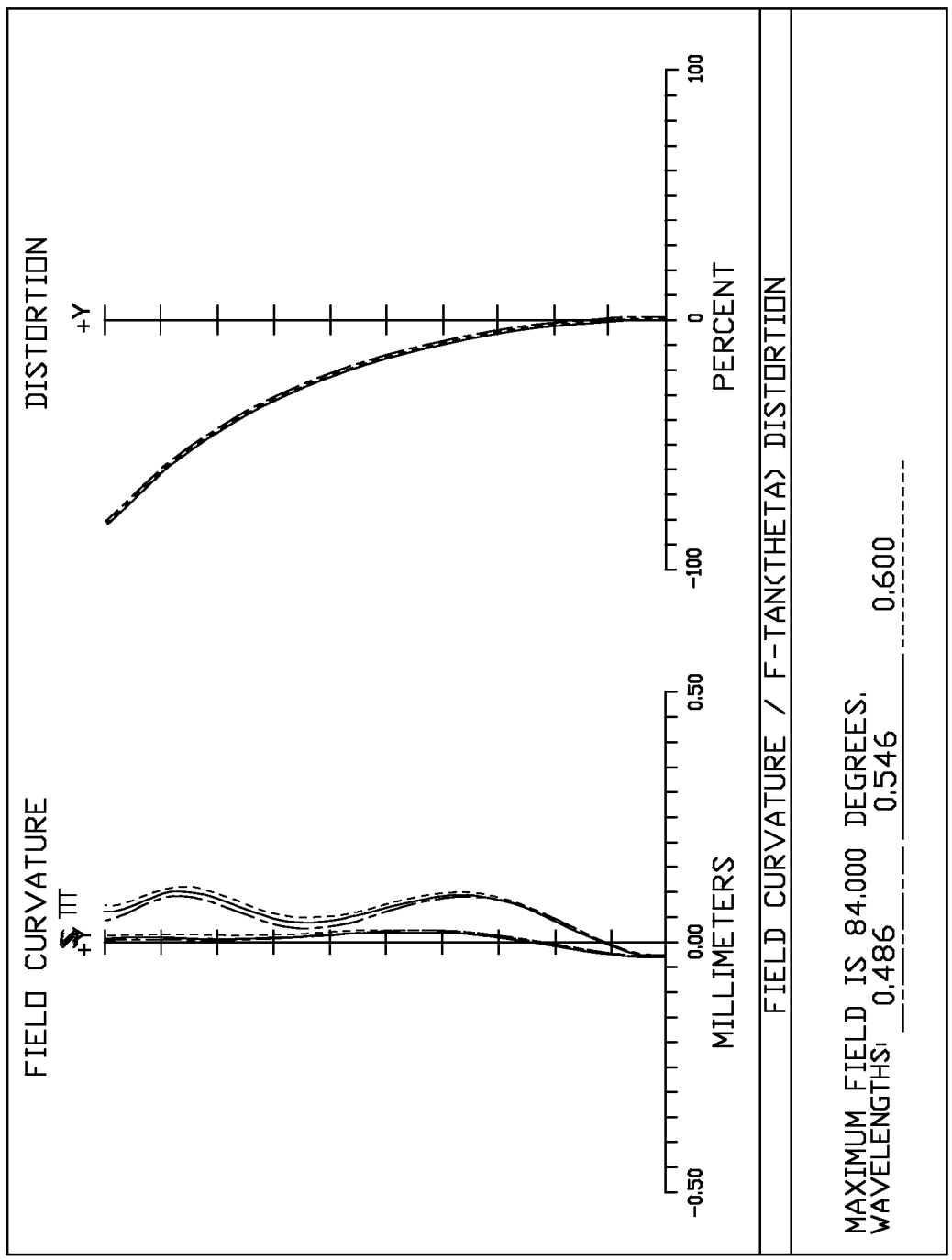
FIG. 4A is a diagram showing the field curvature and the distortion of the lens module in accordance with the fourth embodiment of the present invention.
Figure 4B:
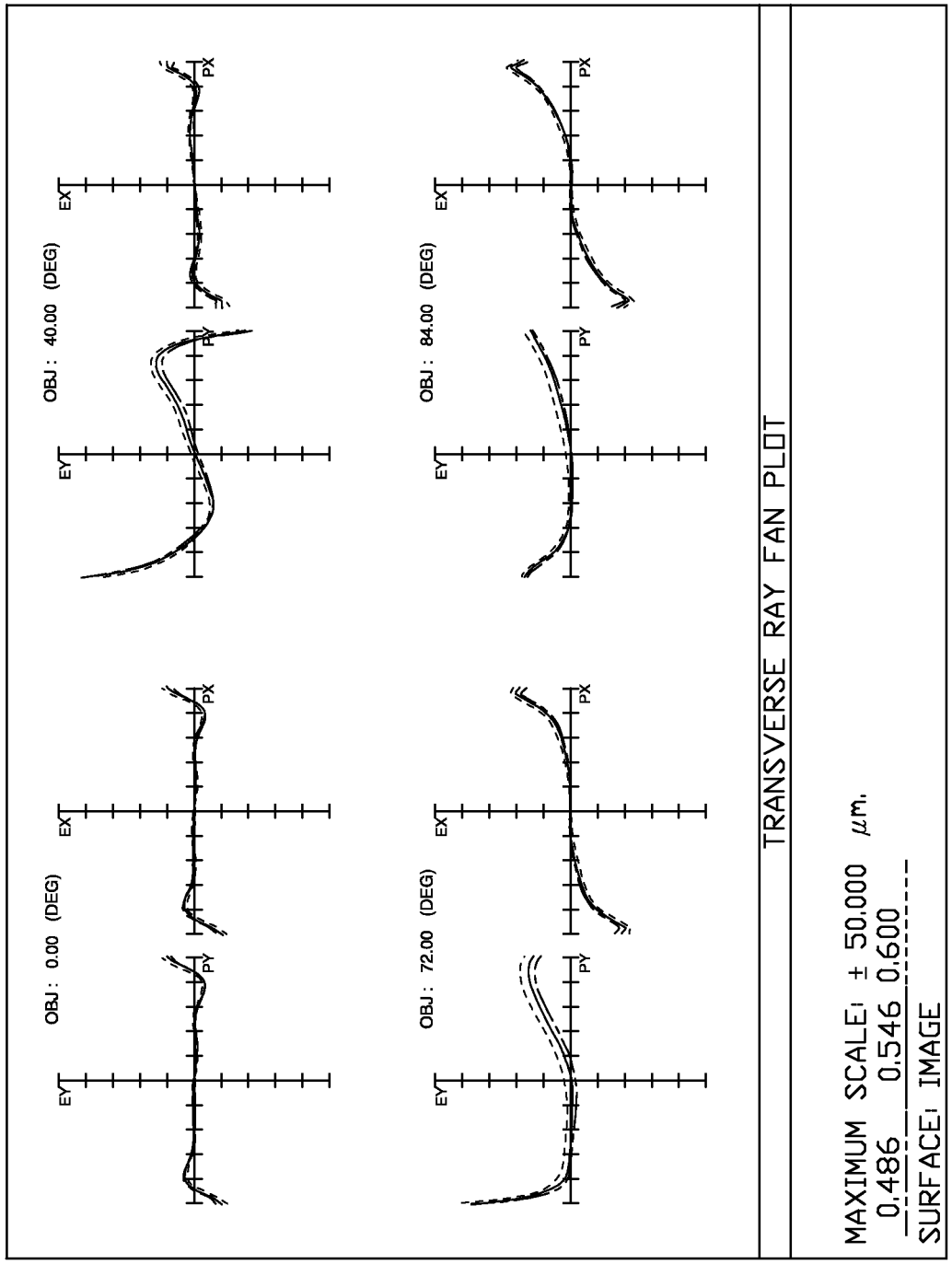
FIG. 4B is a diagram showing the transverse ray fan plot of the lens module in accordance with the fourth embodiment of the present invention at 25° C.
Figure 4C:
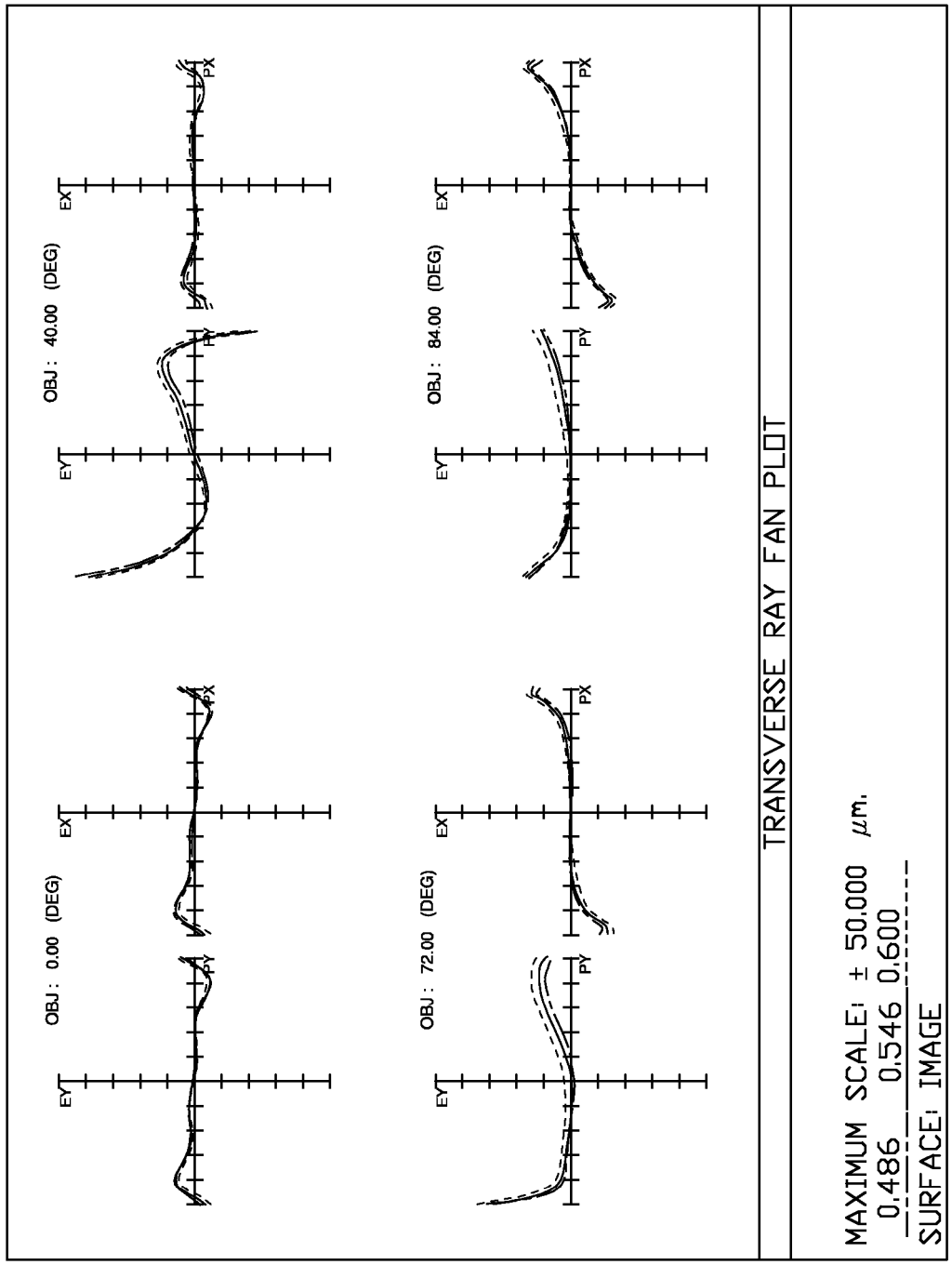
FIG. 4C is a diagram showing the transverse ray fan plot of the lens module in accordance with the fourth embodiment of the present invention at −50° C.
Figure 4D:
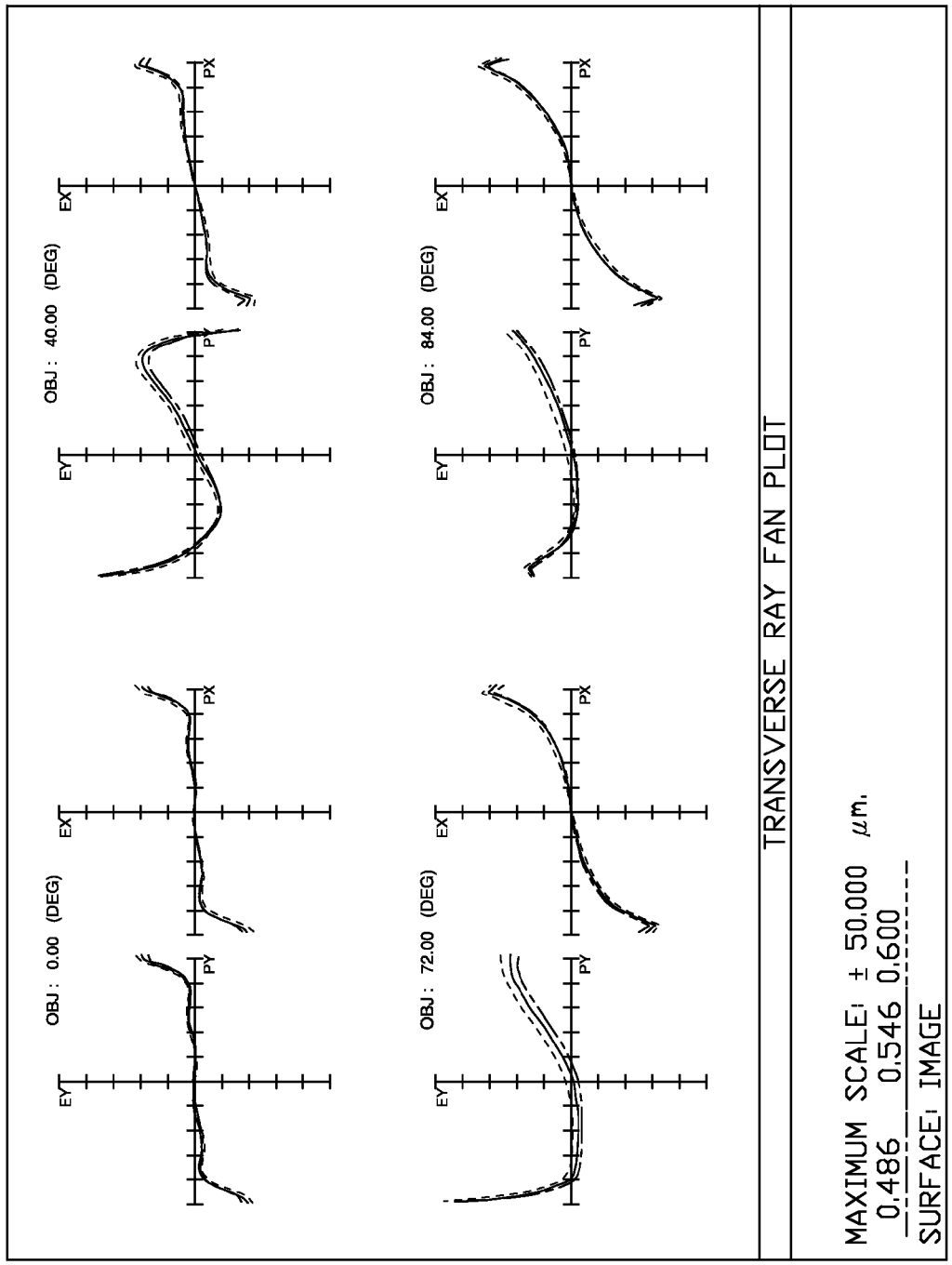
FIG. 4D is a diagram showing the transverse ray fan plot of the lens module in accordance with the fourth embodiment of the present invention at 100° C.

Please refer to FIG. 4 for a five-piece wide-angle lens module 400 in accordance with the fourth embodiment of the present invention. The structural arrangement of the fourth embodiment is similar to that of the first embodiment, and the optical feature data thereof are listed in Table 7:

TABLE 7

| Lens | Surface | Radius | Thickness | Nd | Vd | Conic |
|---|---|---|---|---|---|---|
| Object | | ∞ | ∞ | | | 0 |
| First lens | Object surface 1 | 23 | 1 | 1.834 | 42.7 | 0 |
| | Image surface 2 | 5.6 | 4.332 | | | 0 |
| Second lens | Object surface 3 | −6.71 | 2.6 | 1.53 | 56.1 | −13.1 |
| | Image surface 4 | 4.9 | 0.8 | | | 1 |
| Third lens | Object surface 5 | 5.24 | 8.13 | 1.64 | 23.5 | −0.405 |
| | Image surface 6 | 3.7 | 0.235 | | | −26.45 |
| Stop | | ∞ | −0.174 | | | 0 |
| Fourth lens | Object surface 8 | 2.45 | 3.35 | 1.53 | 56.1 | −11.2 |
| | Image surface 9 | −1.47 | 0.15 | | | −0.441 |
| Fifth lens | Object surface 10 | −1.65 | 0.659 | 1.64 | 23.5 | −0.414 |
| | Image surface 11 | −2.33 | 0.098 | | | −8.5 |
| Plate glass | Object surface 12 | ∞ | 0.9 | 1.52 | 64.1 | 0 |
| | Image surface 13 | ∞ | 3.1 | | | 0 |
| Image | | ∞ | | | | 0 |

Likewise, all the object sides and the image sides of the second lens 420, the third lens 430, the fourth lens 450 and the fifth lens 460 are aspheric surfaces and satisfy the above-mentioned shape formula, the coefficients of the aspheric surface thereof are listed in Table 8:

TABLE 8

| | Object surface 3 | Image surface 4 | Object surface 5 | Image surface 6 |
|---|---|---|---|---|
| A | 0.0008 | 0.0212 | 0.0128 | 0.0436 |
| B | 0 | −0.0024 | −0.0015 | 0.0144 |
| C | −4.569e−6 | 0 | 0.0001 | −0.013 |
| D | 2.4873e−7 | 0 | 5.0128e−6 | −0.0011 |
| E | −3.832e−9 | −1.151e−6 | −5.172e−7 | 0.003 |
| F | 5.5883e−12 | 2.1471e−9 | 7.5125e−10 | 0.0012 |
| G | −1.024e−12 | 1.777e−10 | 4.5771e−10 | −0.0033 |

| | Object surface 8 | Image surface 9 | Object surface 10 | Image surface 11 |
|---|---|---|---|---|
| A | 0.0414 | 0.0009 | −0.0197 | −0.0694 |
| B | 0.014 | 0.0325 | 0.0361 | 0.028 |
| C | −0.023 | −0.009 | −0.0025 | −0.0038 |
| D | 0.0049 | 0.0004 | −0.0015 | 0.0001 |
| E | −0.0012 | 0 | 0 | 0 |
| F | −0.0011 | 0 | 0 | 0 |
| G | −0.0001 | 0 | −0.0001 | 0 |

Based on the above-mentioned design, the total focal length f of the present embodiment is 1.29 mm, the total length TTL thereof is 25.18 mm, the angle of view thereof is 168 degrees, the focal length of the first lens 410 is −9.05 mm, the focal length of the second lens 420 is −4.88 mm, the focal length of the third lens 430 is 18.11 mm, the focal length of the fourth lens 450 is 2.44 mm, and the focal length of the fifth lens 460 is −14.11 mm.

Thereby, the system has a good refractive power arrangement and can effectively modify the aberration of the wide-angle system. Such arrangement also enables the lens module 400 to have excellent and consistent image quality in the environment having severe temperature changes. Test results of which are shown in FIGS. 4A-4D.

In the present embodiment, $(r_8-r_9)/(r_8+r_9)$ is 4 and satisfies the relationship of $2<(r_8-r_9)/(r_8+r_9)<4.2$. Therefore, the incident angle of lights incident on the fourth lens 450 from the stop 440 is smaller, which is helpful for the reduction of the system sensitivity.

In the present embodiment, $(r_2-r_3)/(r_2+r_3)$ is −11.1 and satisfies the relationship of $-12<(r_2-r_3)/(r_2+r_3)<-2$. Therefore, the system aberration is modified and the system resolving power is elevated. In addition, the incident angle of lights incident on the second lens 420 from the first lens 410 can be lowered, and thus the lights can be refracted smoother so as to reduce the system sensitivity.

In the present embodiment, $d_4/f$ is 0.62 and satisfies the relationship of $0.6<d_4/f<1$. Therefore, the aberration caused by margin rays can be mitigated.

In the present embodiment, $d_9/f$ is 0.116 and satisfies the relationship of $0<d_9/f<0.2$. Therefore, the system aberration can be modified, and the image quality can be elevated.

Figure 4E:
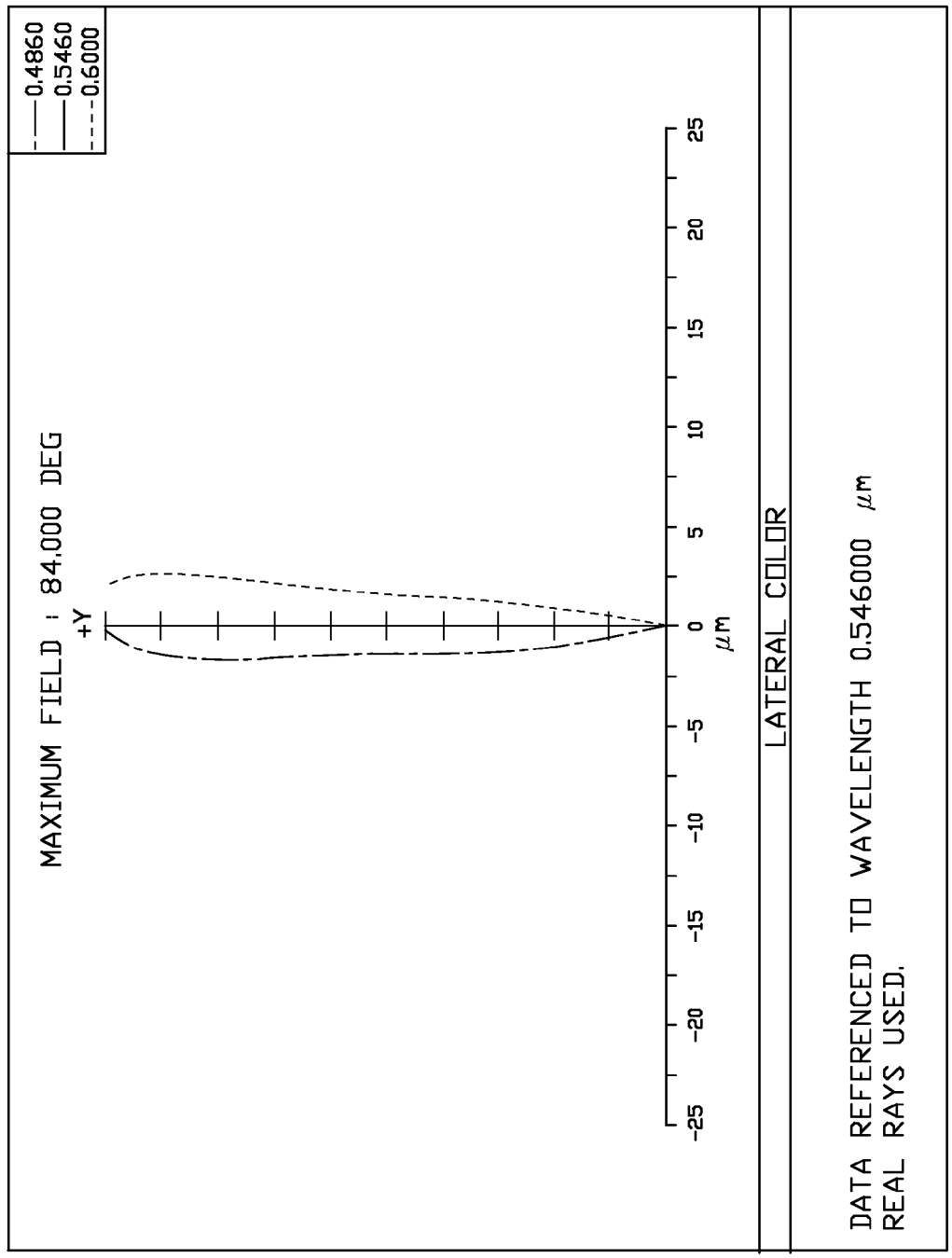
FIG. 4E is a diagram showing the lateral color aberration of the lens module in accordance with the fourth embodiment of the present invention.

In the present embodiment, $Vd_4-Vd_5$ is 32.6 and satisfies the relationship of $Vd_4-Vd_5>25$. Therefore, the lateral color aberration of the system can be modified. A test result of which is shown in FIG. 4E.

Please refer to FIG. 5 for a five-piece wide-angle lens module 500 in accordance with the fifth embodiment of the present invention. The structural arrangement of the fifth embodiment is similar to that of the first embodiment, and the optical feature data thereof are listed in Table 9:

TABLE 9

| Lens | Surface | Radius | Thickness | Nd | Vd | Conic |
|---|---|---|---|---|---|---|
| Object | | ∞ | ∞ | | | 0 |
| First lens | Object surface 1 | 20 | 0.9 | 1.834 | 42.7 | 0 |
| | Image surface 2 | 6 | 4.332 | | | 0 |
| Second lens | Object surface 3 | −7.23 | 2.54 | 1.53 | 56.1 | −12.74 |
| | Image surface 4 | 4.9 | 0.9 | | | 1 |
| Third lens | Object surface 5 | 5.34 | 8.13 | 1.64 | 23.5 | −0.35 |
| | Image surface 6 | 3.6 | 0.24 | | | −26.31 |
| Stop | | ∞ | −0.17 | | | 0 |
| Fourth lens | Object surface 8 | 2.5 | 3.36 | 1.53 | 56.1 | −11.23 |
| | Image surface 9 | −1.48 | 0.03 | | | −0.44 |
| Fifth lens | Object surface 10 | −1.7 | 0.67 | 1.64 | 23.5 | −0.413 |
| | Image surface 11 | −2.32 | 1.05 | | | −8.51 |
| Plate glass | Object surface 12 | ∞ | 0.9 | 1.52 | 64.1 | 0 |
| | Image surface 13 | ∞ | 2.245 | | | 0 |
| Image | | ∞ | | | | 0 |

Likewise, all the object sides and the image sides of the second lens 520, the third lens 530, the fourth lens 550 and the fifth lens 560 are aspheric surfaces and satisfy the above-mentioned shape formula, the coefficients of the aspheric surface thereof are listed in Table 10:

TABLE 10

| | Object surface 3 | Image surface 4 | Object surface 5 | Image surface 6 |
|---|---|---|---|---|
| A | 0.0008 | 0.0211 | 0.0129 | 0.0438 |
| B | 0 | −0.0024 | −0.0015 | 0.0146 |
| C | −4.58e−6 | 0 | 0.0001 | −0.0128 |
| D | 2.4847e−7 | 0 | 4.9971e−6 | −0.0009 |
| E | −3.833e−9 | −1.153e−6 | −5.181e−7 | 0.0031 |
| F | 5.5564e−12 | 2.0574e−9 | 6.7359e−10 | 0.0011 |
| G | −1.056e−12 | 1.7573e−10 | 4.5772e−10 | −0.0038 |

| | Object surface 8 | Image surface 9 | Object surface 10 | Image surface 11 |
|---|---|---|---|---|
| A | 0.0413 | 0.001 | −0.0197 | −0.0698 |
| B | 0.0139 | 0.0324 | 0.0362 | 0.028 |
| C | −0.023 | −0.0091 | −0.0024 | −0.0038 |
| D | 0.0049 | 0.0004 | −0.0015 | 0.0001 |
| E | −0.0012 | 0 | 0 | 0.0001 |
| F | −0.0011 | 4.073e−6 | 0 | 0 |
| G | −0.0001 | 0 | 0 | 0 |

Based on the above-mentioned design, the total focal length f of the present embodiment is 1.38 mm, the total length TTL thereof is 25.127 mm, the angle of view thereof is 168 degrees, the focal length of the first lens 510 is −10.51 mm, the focal length of the second lens 520 is −5.06 mm, the focal length of the third lens 530 is 20.42 mm, the focal length of the fourth lens 550 is 2.45 mm, and the focal length of the fifth lens 560 is −17.08 mm.

Thereby, the system has a good refractive power arrangement and can effectively modify the aberration of the wide-angle system. Such arrangement also enables the lens module 500 to have excellent and consistent image quality in the environment having severe temperature changes. Test results of which are shown in FIGS. 5A-5D.

In the present embodiment, $(r_8-r_9)/(r_8+r_9)$ is 3.9 and satisfies the relationship of $2<(r_8-r_9)/(r_8+r_9)<4.2$. Therefore, the incident angle of lights incident on the fourth lens 550 from the stop 540 is smaller, which is helpful for the reduction of the system sensitivity.

In the present embodiment, $(r_2-r_3)/(r_2+r_3)$ is −10.76 and satisfies the relationship of $-12<(r_2-r_3)/(r_2+r_3)<-2$. Therefore, the system aberration is modified and the system resolving power is elevated. In addition, the incident angle of lights incident on the second lens 520 from the first lens 510 can be lowered, and thus the lights can be refracted smoother so as to reduce the system sensitivity.

In the present embodiment, $d_4/f$ is 0.65 and satisfies the relationship of $0.6<d_4/f<1$. Therefore, the aberration caused by margin rays can be mitigated.

In the present embodiment, $d_9/f$ is 0.02 and satisfies the relationships of $0<d_9/f<0.2$ and $0<d_9/f<0.08$. Therefore, the system aberration can be modified, and the image quality can be elevated.

Figure 5A:
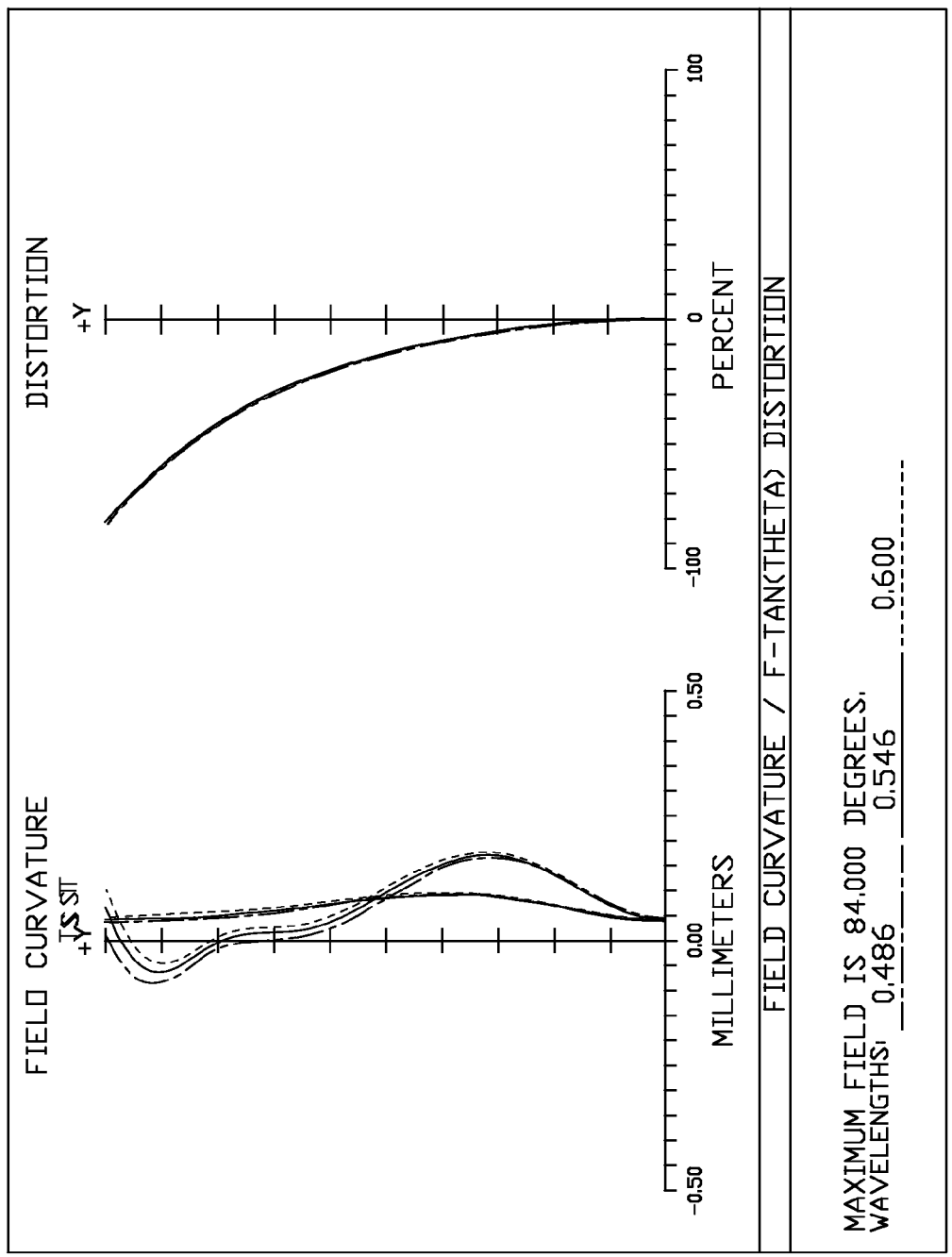
FIG. 5A is a diagram showing the field curvature and the distortion of the lens module in accordance with the fifth embodiment of the present invention.
Figure 5B:
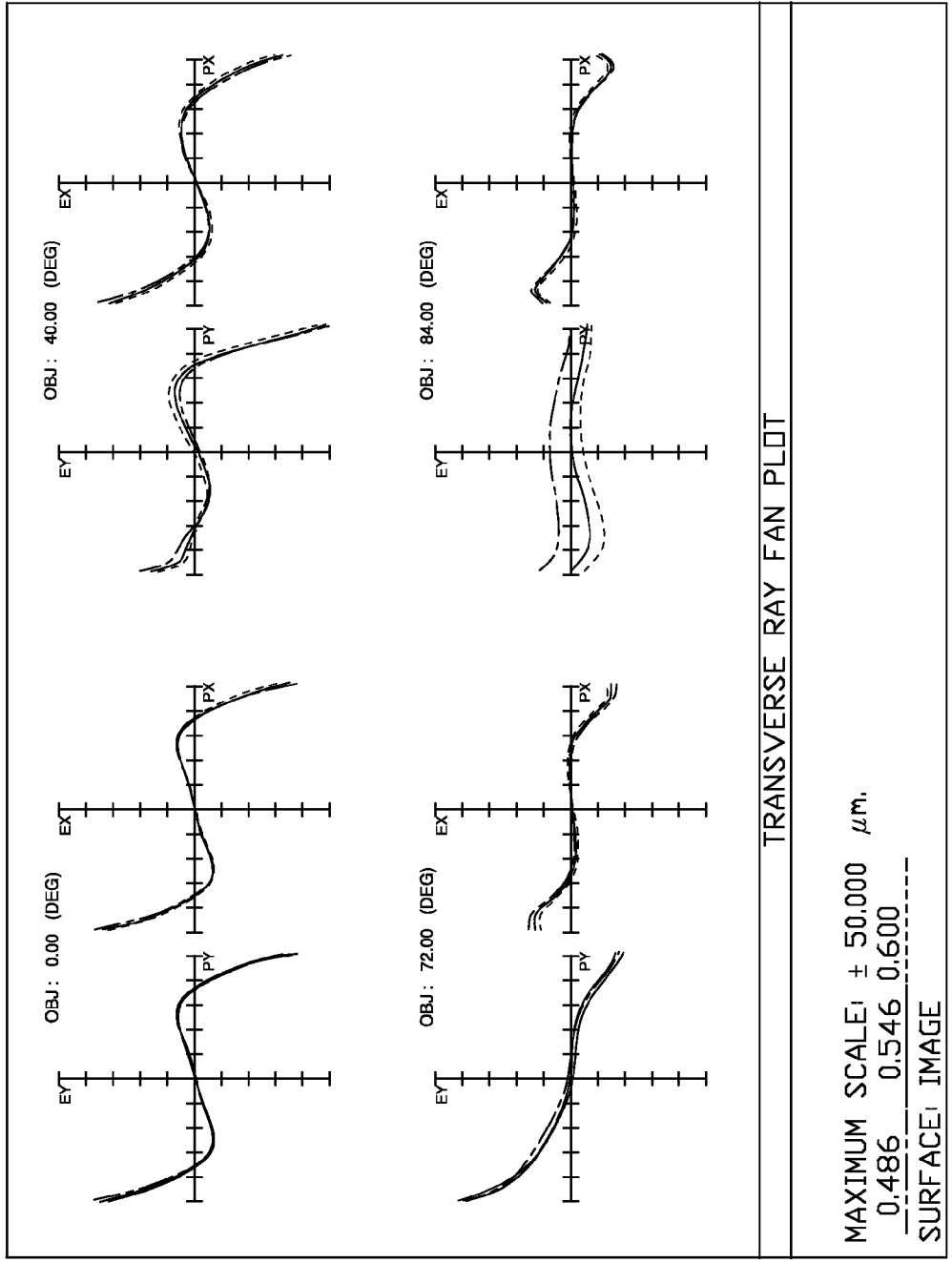
FIG. 5B is a diagram showing the transverse ray fan plot of the lens module in accordance with the fifth embodiment of the present invention at 25° C.
Figure 5C:
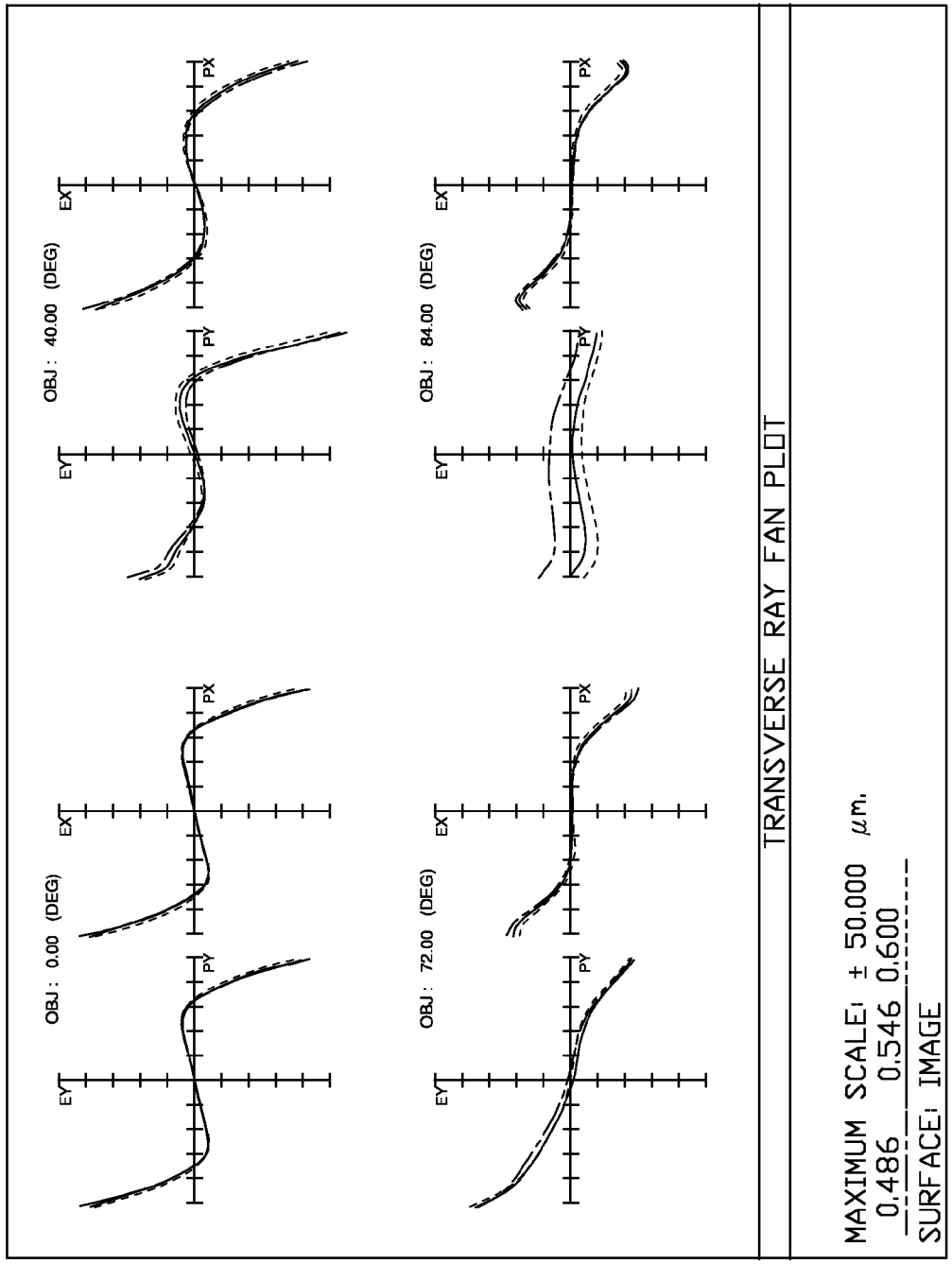
FIG. 5C is a diagram showing the transverse ray fan plot of the lens module in accordance with the fifth embodiment of the present invention at −50° C.
Figure 5D:
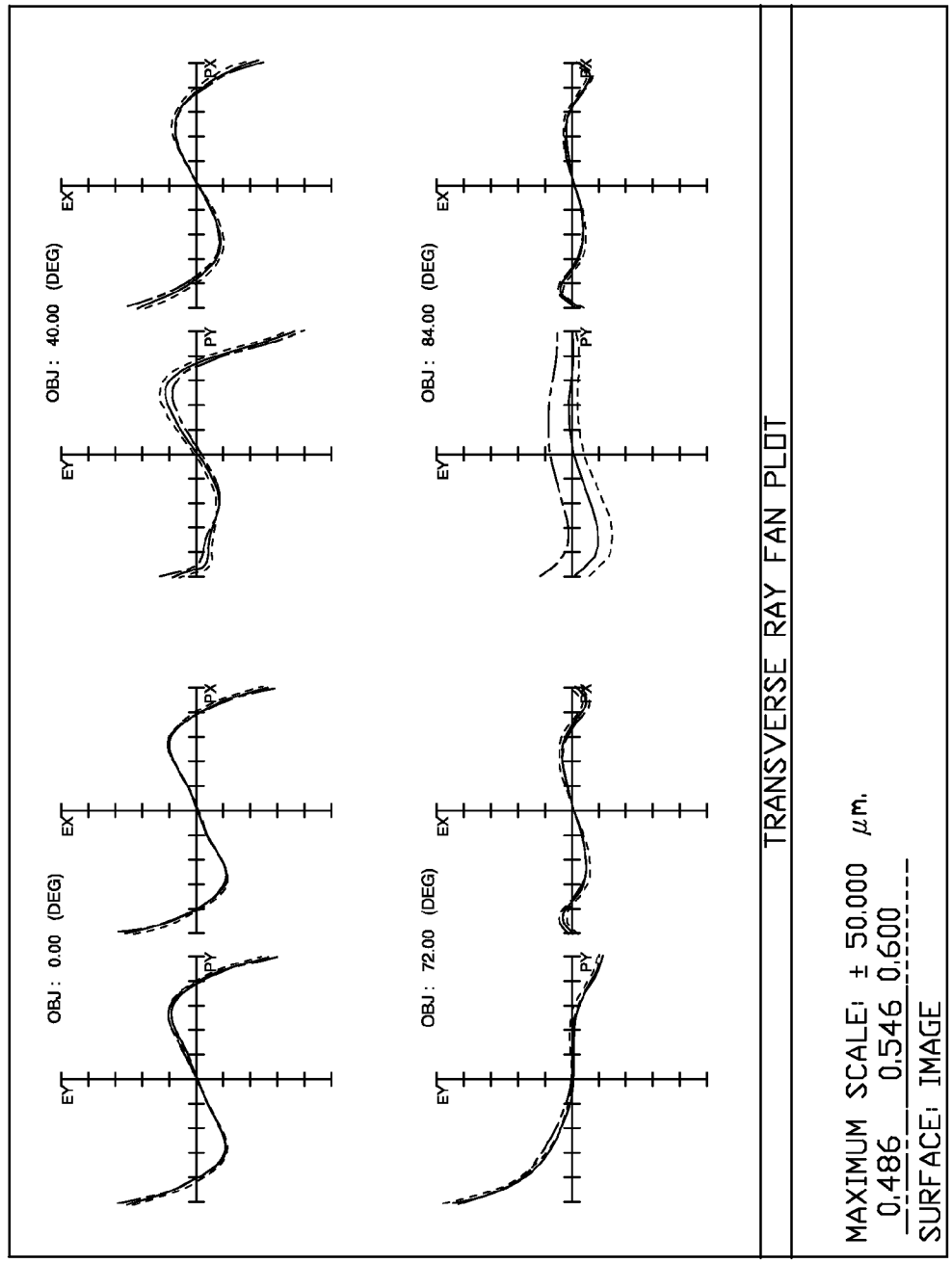
FIG. 5D is a diagram showing the transverse ray fan plot of the lens module in accordance with the fifth embodiment of the present invention at 100° C.
Figure 5E:
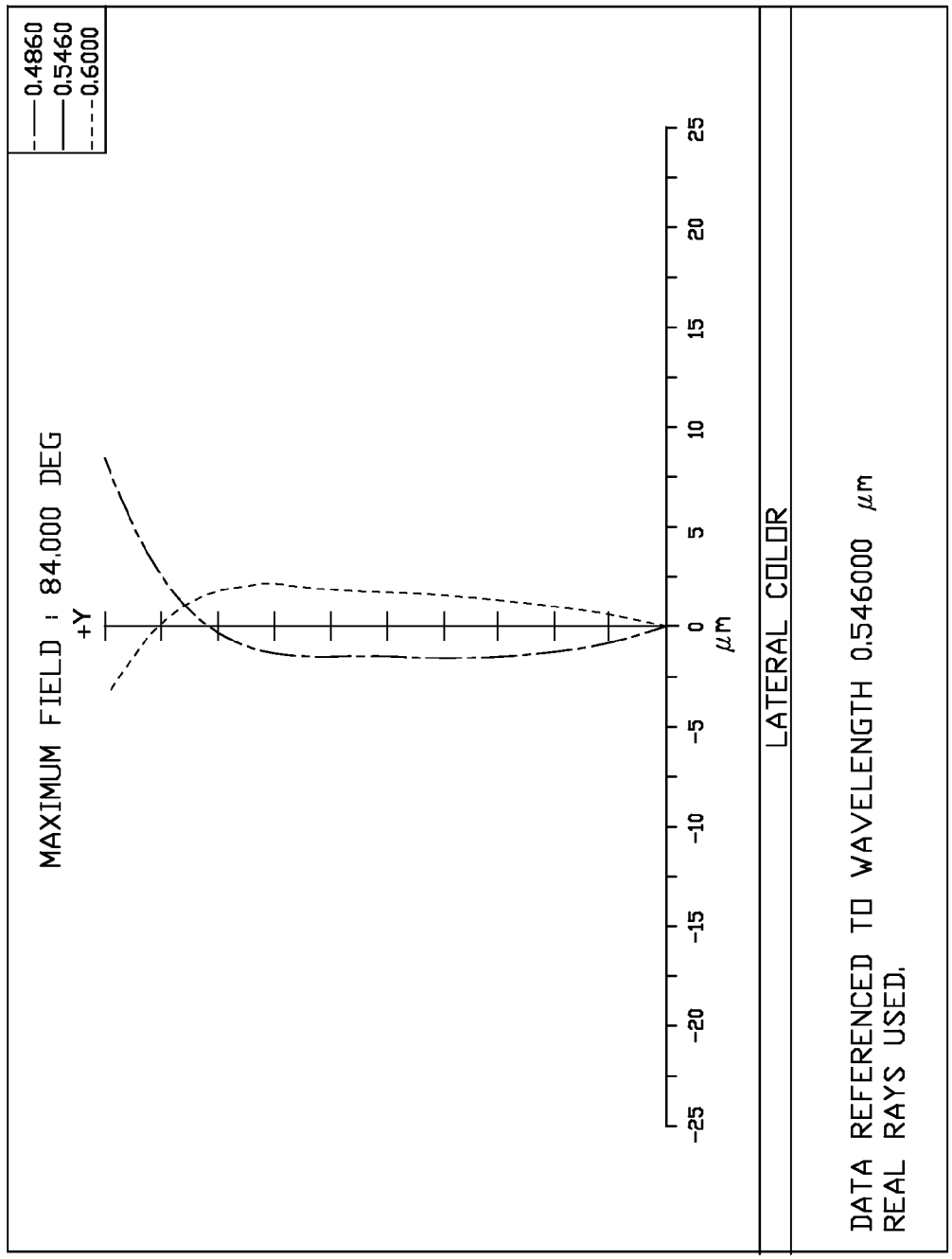
FIG. 5E is a diagram showing the lateral color aberration of the lens module in accordance with the fifth embodiment of the present invention.

In the present embodiment, $Vd_4-Vd_5$ is 32.6 and satisfies the relationship of $Vd_4-Vd_5>25$. Therefore, the lateral color aberration of the system can be modified. A test result of which is shown in FIG. 5E.

In light of foregoing, the view of angle of the present invention can reach 166 degrees or higher. Meanwhile, the image quality thereof is also significantly elevated in the environments of high temperature (100° C.) and low temperature (−50° C.). Therefore, the present invention meets the practical needs.

It is noticed that although both the object surface and the image surface of each of the second lens to the fifth lens in accordance with the above-mentioned embodiments are aspheric surfaces, each of the second lens to the fifth lens is only required to have at least one aspheric surface. And because of the aspheric surfaces, the second lens to the fifth lens are preferably made of plastic to reduce manufacturing cost and increase yield rate. The first lens is preferably made of glass that has better wear resistance and scrape resistance. However, the material of the lenses is not limited to the above-mentioned material. Furthermore, the five-piece wide-angle lens module of the present invention can not only be utilized in vehicle-use cameras but also in surveillance cameras and other purposes.

The invention described above is capable of many modifications, and may vary. Any such variations are not to be regarded as departures from the spirit of the scope of the invention, and all modifications which would be obvious to someone with the technical knowledge are intended to be included within the scope of the following claims.

What is claimed is:

1. A five-piece wide-angle lens module, comprising in a sequence from an object side to an image side of:
    a first lens, having a negative refractive power, a convex surface on the object side and a concave surface on the image side;
    a second lens, having a negative refractive power and two concave surfaces on the object side and the image side respectively;

a third lens, having a positive refractive power;

a stop;

a fourth lens, having a positive refractive power and two convex surfaces on the object side and the image side respectively;

a fifth lens, having a negative refractive power;

wherein each of the second lens, the third lens, the fourth lens and the fifth lens has at least one aspheric surface;

wherein the five-piece wide-angle lens module satisfies the following relationship:

$$2<(r_8-r_9)/(r_8+r_9)<4.2;$$

wherein $r_8$ is a radius of curvature of the object side of the fourth lens, $r_9$ is a radius of curvature of the image side of the fourth lens.

2. The five-piece wide-angle lens module of claim 1, further satisfying the following relationship:

$$Vd_4-Vd_5>25;$$

wherein $Vd_4$ is an Abbe number of the fourth lens, and $Vd_5$ is an Abbe number of the fifth lens.

3. The five-piece wide-angle lens module of claim 1, wherein the third lens has a concave surface on the image side.

4. The five-piece wide-angle lens module of claim 1, wherein a shape of each of the aspheric surfaces satisfies the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of the surface along an optical axis of the lens module at a position with a height h, c is a reciprocal of a radius of curvature of the surface, k is a conic constant, A is a coefficient of fourth level aspheric surface, B is a coefficient of sixth level aspheric surface, C is a coefficient of eighth level aspheric surface, D is a coefficient of tenth level aspheric surface, E is a coefficient of twelfth level aspheric surface, F is a coefficient of fourteenth level aspheric surface, and G is a coefficient of sixteenth level aspheric surface.

5. A five-piece wide-angle lens module, comprising in a sequence from an object side to an image side of:

a first lens, having a negative refractive power, a convex surface on the object side and a concave surface on the image side;

a second lens, having a negative refractive power and two concave surfaces on the object side and the image side respectively;

a third lens, having a positive refractive power and a concave surface on the image side;

a stop;

a fourth lens, having a positive refractive power and two convex surfaces on the object side and the image side respectively;

a fifth lens, having a negative refractive power;

wherein each of the second lens, the third lens, the fourth lens and the fifth lens has at least one aspheric surface;

wherein the five-piece wide-angle lens module satisfies the following relationship:

$$-12<(r_2-r_3)/(r_2+r_3)<-2;$$

wherein $r_2$ is a radius of curvature of the image side of the first lens, $r_3$ is a radius of curvature of the object side of the second lens.

6. The five-piece wide-angle lens module of claim 5, further satisfying the following relationship:

$$Vd_4-Vd_5>25;$$

wherein $Vd_4$ is an Abbe number of the fourth lens, and $Vd_5$ is an Abbe number of the fifth lens.

7. The five-piece wide-angle lens module of claim 5, wherein a shape of each of the aspheric surfaces satisfies the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of the surface along an optical axis of the lens module at a position with a height h, c is a reciprocal of a radius of curvature of the surface, k is a conic constant, A is a coefficient of fourth level aspheric surface, B is a coefficient of sixth level aspheric surface, C is a coefficient of eighth level aspheric surface, D is a coefficient of tenth level aspheric surface, E is a coefficient of twelfth level aspheric surface, F is a coefficient of fourteenth level aspheric surface, and G is a coefficient of sixteenth level aspheric surface.

8. A five-piece wide-angle lens module, comprising in a sequence from an object side to an image side of:

a first lens, having a negative refractive power, a convex surface on the object side and a concave surface on the image side;

a second lens, having a negative refractive power and two concave surfaces on the object side and the image side respectively;

a third lens, having a positive refractive power;

a stop;

a fourth lens, having a positive refractive power and two convex surfaces on the object side and the image side respectively;

a fifth lens, having a negative refractive power;

wherein each of the second lens, the third lens, the fourth lens and the fifth lens has at least one aspheric surface;

wherein the five-piece wide-angle lens module satisfies the following relationship:

$$0.6<d_4/f<1;$$

wherein $d_4$ is a distance from the image side of the second lens to the object side of the third lens along an optical axis of the five-piece wide-angle lens module, f is a focal length of the five-piece wide-angle lens module.

9. The five-piece wide-angle lens module of claim 8, further satisfying the following relationship:

$$Vd_4-Vd_5>25;$$

wherein $Vd_4$ is an Abbe number of the fourth lens, and $Vd_5$ is an Abbe number of the fifth lens.

10. The five-piece wide-angle lens module of claim 8, wherein the third lens has a concave surface on the image side.

11. The five-piece wide-angle lens module of claim 8, wherein a shape of each of the aspheric surfaces satisfies the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of the surface along an optical axis of the lens module at a position with a height h, c is a reciprocal of a radius of curvature of the surface, k is a conic constant, A is a coefficient of fourth level aspheric surface, B is a coefficient of sixth level aspheric surface, C is a coefficient of eighth level aspheric surface, D is a coefficient of tenth level aspheric surface, E is a coefficient of twelfth level aspheric surface, F is a coefficient of fourteenth level aspheric surface, and G is a coefficient of sixteenth level aspheric surface.

12. A five-piece wide-angle lens module, comprising in a sequence from an object side to an image side of:
- a first lens, having a negative refractive power, a convex surface on the object side and a concave surface on the image side;
- a second lens, having a negative refractive power and two concave surfaces on the object side and the image side respectively;
- a third lens, having a positive refractive power;
- a stop;
- a fourth lens, having a positive refractive power and two convex surfaces on the object side and the image side respectively;
- a fifth lens, having a negative refractive power;
- wherein each of the second lens, the third lens, the fourth lens and the fifth lens has at least one aspheric surface;
- wherein the five-piece wide-angle lens module satisfies the following relationship:

$0 < d_9/f < 0.2;$ wherein $d_9$ is a distance from the image side of the fourth lens to the object side of the fifth lens along an optical axis of the five-piece wide-angle lens module, f is a focal length of the five-piece wide-angle lens module.

13. The five-piece wide-angle lens module of claim 12, further satisfying the following relationship:

$0 < d_9/f < 0.08.$

14. The five-piece wide-angle lens module of claim 12, further satisfying the following relationship:

$Vd_4 - Vd_5 > 25;$ wherein $Vd_4$ is an Abbe number of the fourth lens, and $Vd_5$ is an Abbe number of the fifth lens.

15. The five-piece wide-angle lens module of claim 12, wherein the third lens has a concave surface on the image side.

16. The five-piece wide-angle lens module of claim 12, wherein a shape of each of the aspheric surfaces satisfies the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of the surface along an optical axis of the lens module at a position with a height h, c is a reciprocal of a radius of curvature of the surface, k is a conic constant, A is a coefficient of fourth level aspheric surface, B is a coefficient of sixth level aspheric surface, C is a coefficient of eighth level aspheric surface, D is a coefficient of tenth level aspheric surface, E is a coefficient of twelfth level aspheric surface, F is a coefficient of fourteenth level aspheric surface, and G is a coefficient of sixteenth level aspheric surface.

17. The five-piece wide-angle lens module of claim 13, further satisfying the following relationship:

$Vd_4 - Vd_5 > 25;$ wherein $Vd_4$ is an Abbe number of the fourth lens, and $Vd_5$ is an Abbe number of the fifth lens.

18. The five-piece wide-angle lens module of claim 13, wherein the third lens has a concave surface on the image side.

19. The five-piece wide-angle lens module of claim 13, wherein a shape of each of the aspheric surfaces satisfies the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of the surface along an optical axis of the lens module at a position with a height h, c is a reciprocal of a radius of curvature of the surface, k is a conic constant, A is a coefficient of fourth level aspheric surface, B is a coefficient of sixth level aspheric surface, C is a coefficient of eighth level aspheric surface, D is a coefficient of tenth level aspheric surface, E is a coefficient of twelfth level aspheric surface, F is a coefficient of fourteenth level aspheric surface, and G is a coefficient of sixteenth level aspheric surface.

* * * * *